United States Patent [19]

Levy

[11] 3,837,550
[45] Sept. 24, 1974

[54] ROLLER CONVEYING OF STRIP MATERIAL

[75] Inventor: Samuel Levy, Schenectady, N.Y.

[73] Assignee: General Electric Company, Schenectady, N.Y.

[22] Filed: Apr. 18, 1973

[21] Appl. No.: 352,112

Related U.S. Application Data

[63] Continuation of Ser. No. 256,657, May 25, 1972, abandoned.

[52] U.S. Cl.................. 226/4, 226/111, 226/195, 226/189
[51] Int. Cl............................................. B65h 17/42
[58] Field of Search....... 226/189, 188, 111, 4, 195; 318/7

[56] References Cited
UNITED STATES PATENTS

| | | | |
|---|---|---|---|
| 3,176,543 | 4/1965 | Moore et al. | 226/111 X |
| 3,338,493 | 8/1967 | Schiffer | 226/111 |
| 3,372,320 | 3/1968 | Boyum et al. | 318/7 |
| 3,480,191 | 11/1969 | Van Os | 226/189 X |
| 3,561,134 | 2/1971 | Knuckles et al. | 226/111 |

*Primary Examiner*—Allen N. Knowles
*Attorney, Agent, or Firm*—Patrick D. Ward; Joseph T. Cohen; Jerome C. Squillaro

[57] ABSTRACT

Different peripheral speeds of rollers at opposite ends of a series of unidirectionally driven rollers establish velocity $V_s$ and tension T of a thin steel strip being supported on and conveyed along the series. The rest of the rollers are driven at peripheral speeds which are asynchronous relative to $V_s$; some slip faster, or forward, while others slip slower, or behind. Substantially equal but oppositely directed frictional forces are developed in the moving strip by the faster and slower slipping rollers so that the tension T is not changed. Consequently, the strip neither tears nor cobbles. The speed of motors driving the asynchronously rotated rollers may be set to cause said rollers to have an average peripheral speed equal to $V_s$. However, relatively wide variations in motor speed, and resulting peripheral roller speeds, are tolerable because of the relative independence of frictional force magnitudes from slip speed. Also, the speeds of motors driving selected groups of asynchronously rotated rollers may be varied deliberately for, among other purposes, gradually establishing tension in the strip. Also disclosed are ways and means for conveying the strip past one or more groups of stalled rollers. Both cylindrical and frustro-conical rollers are employed in different embodiments.

53 Claims, 32 Drawing Figures

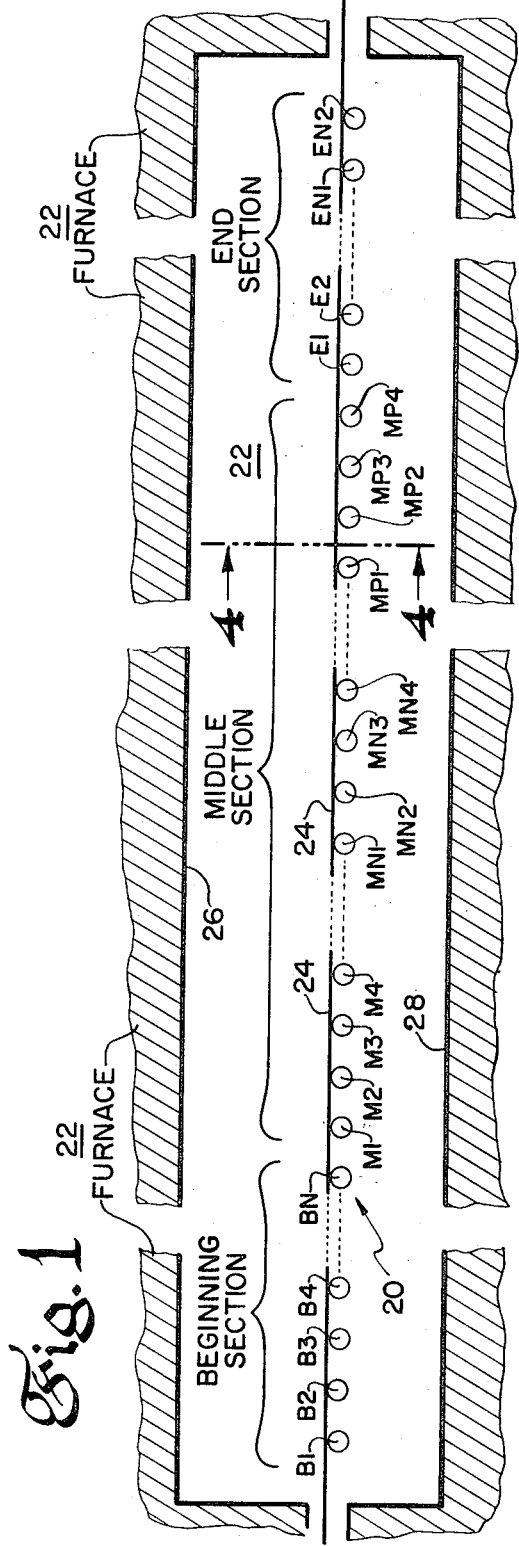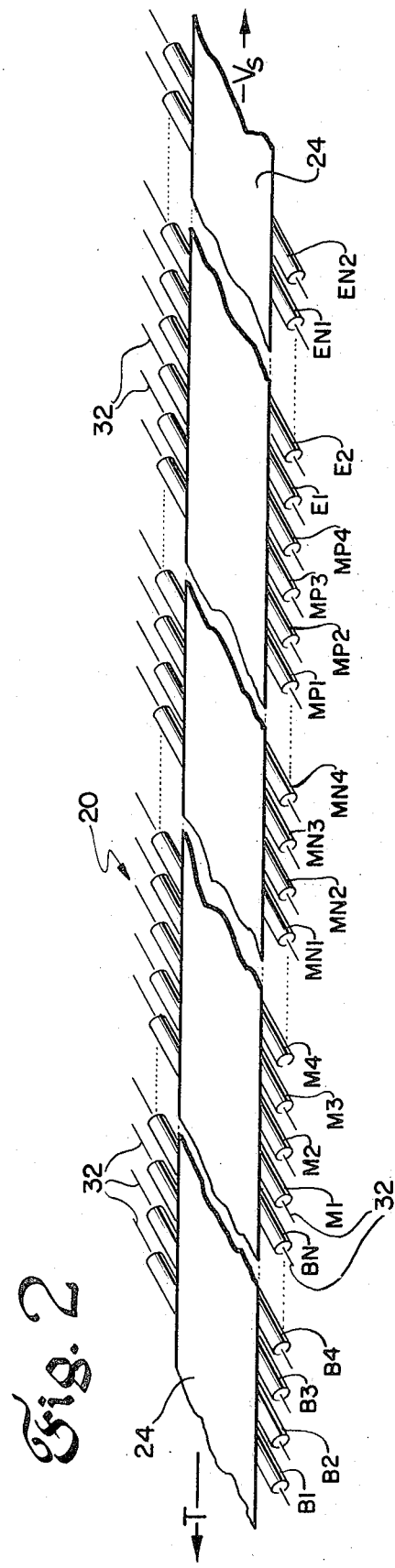

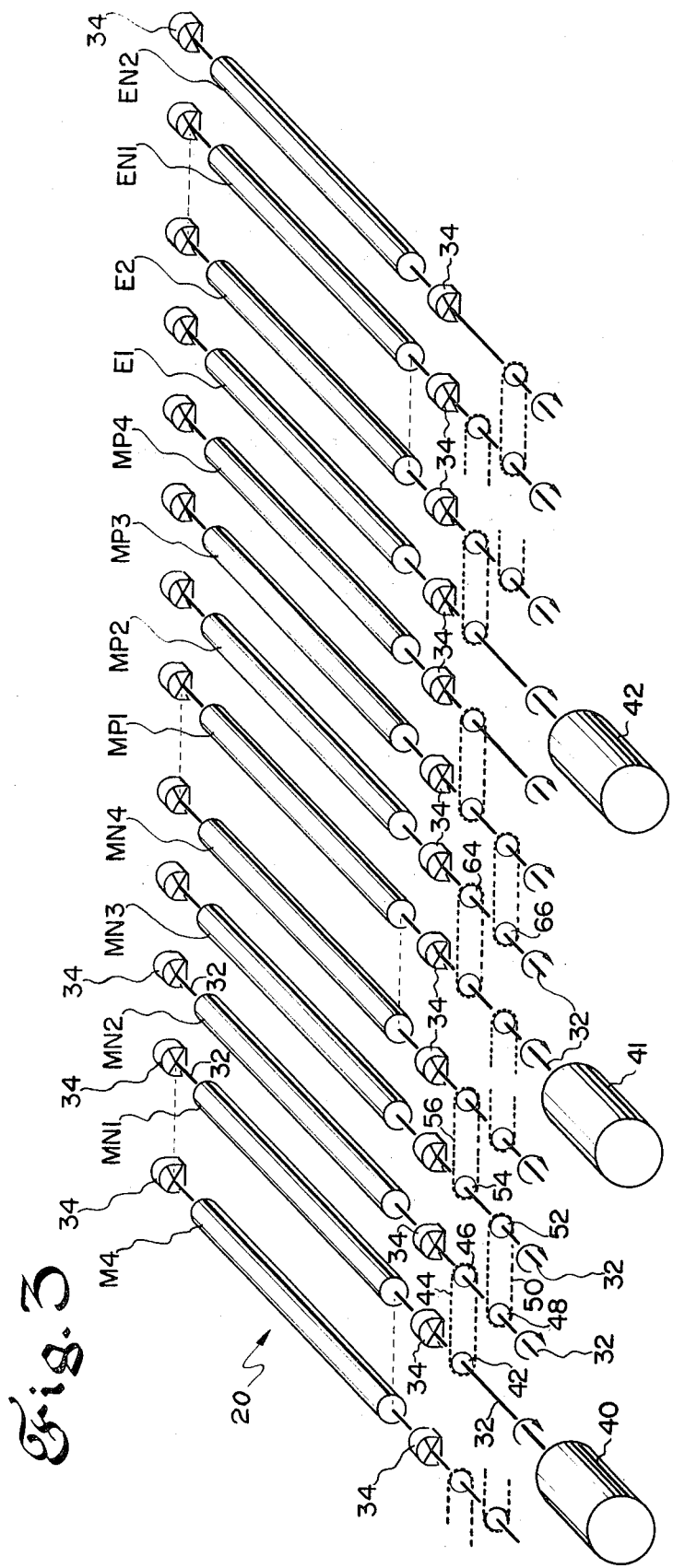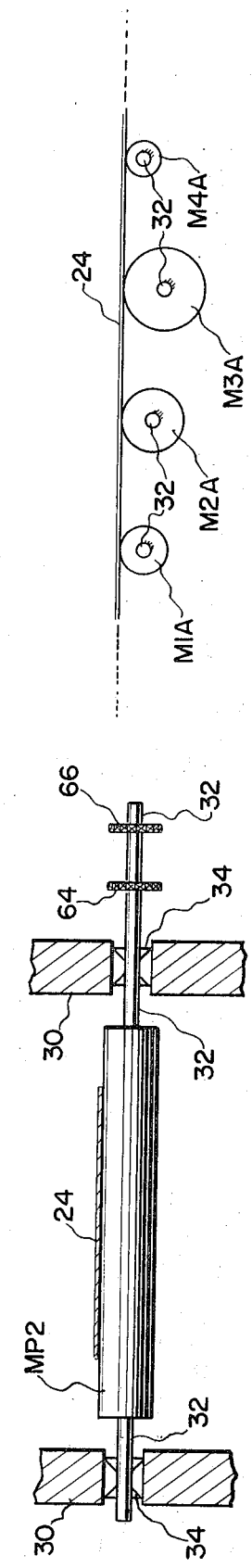

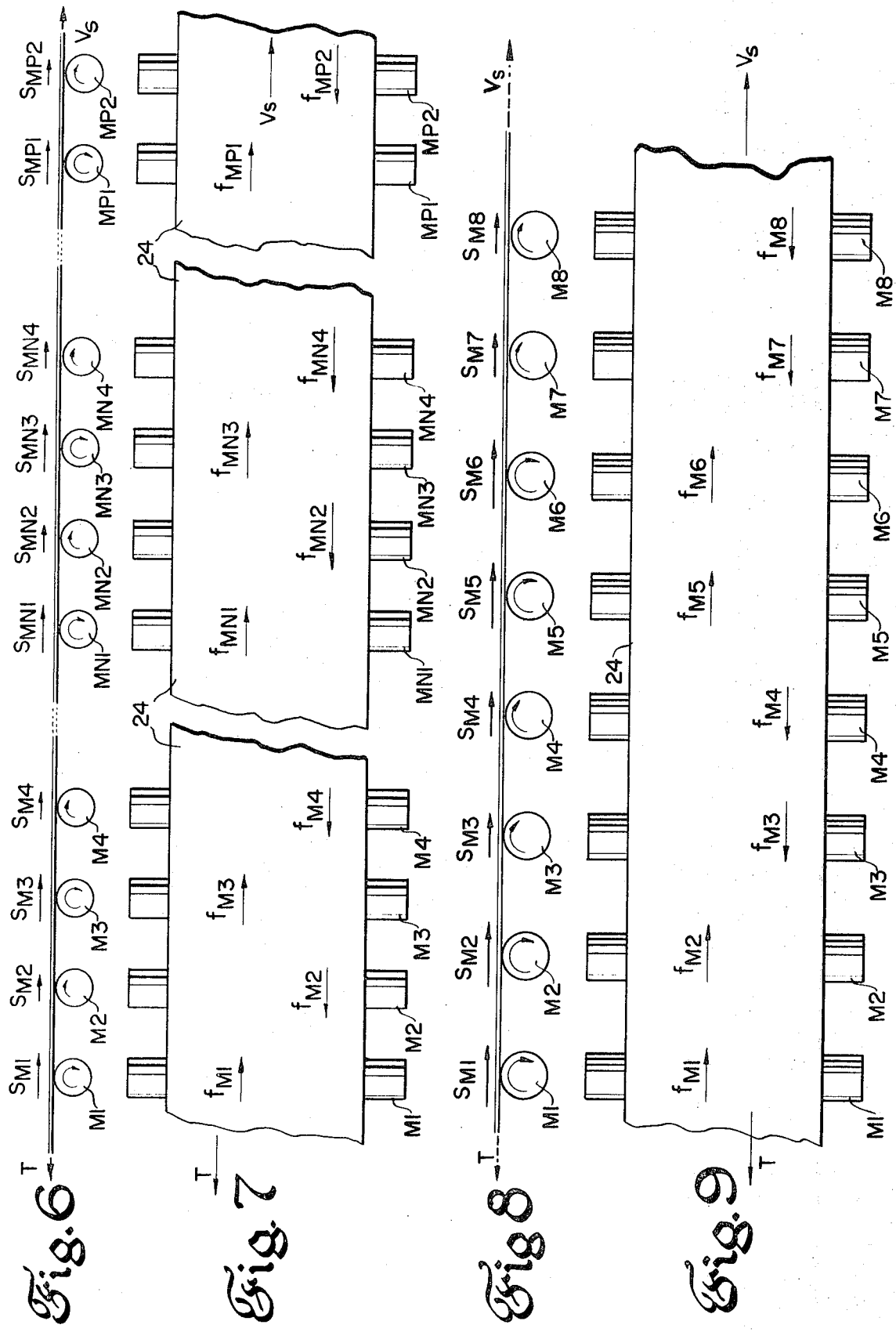

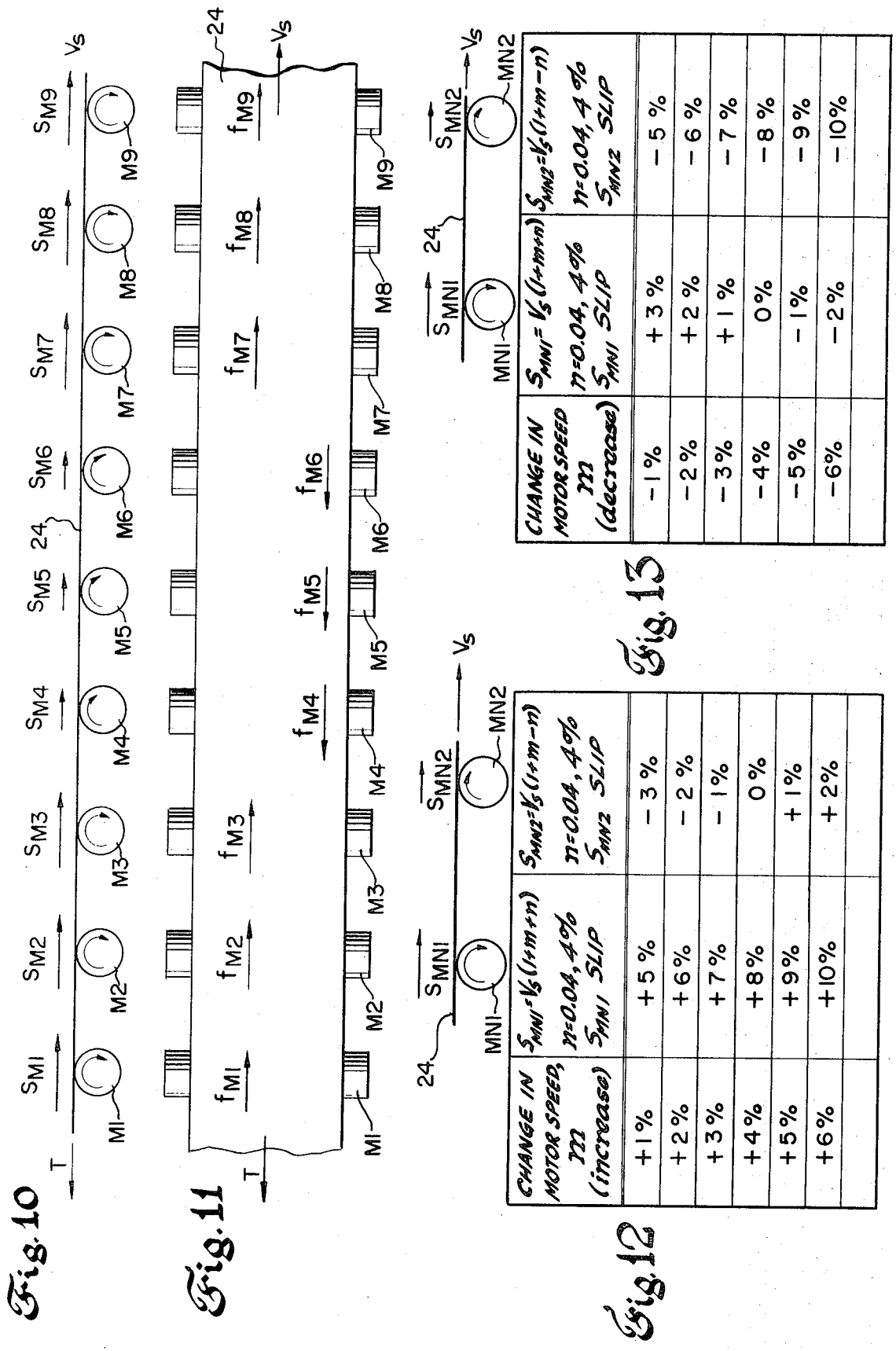

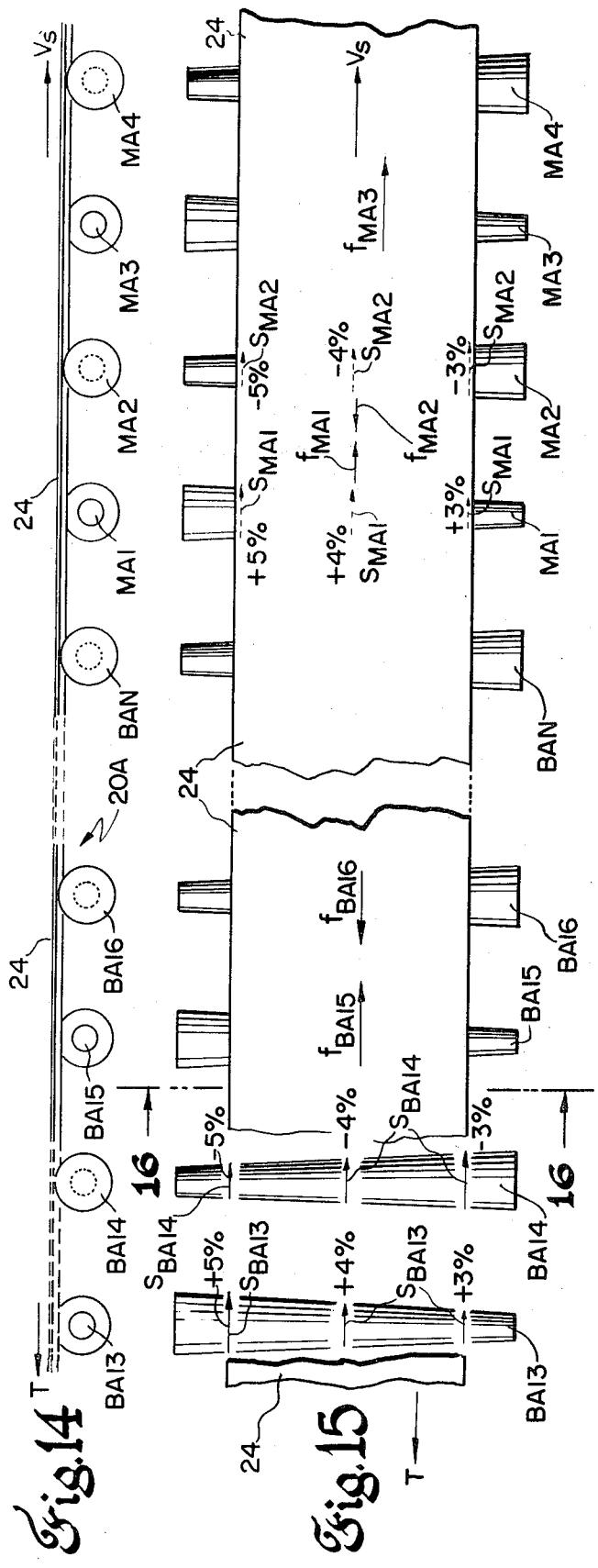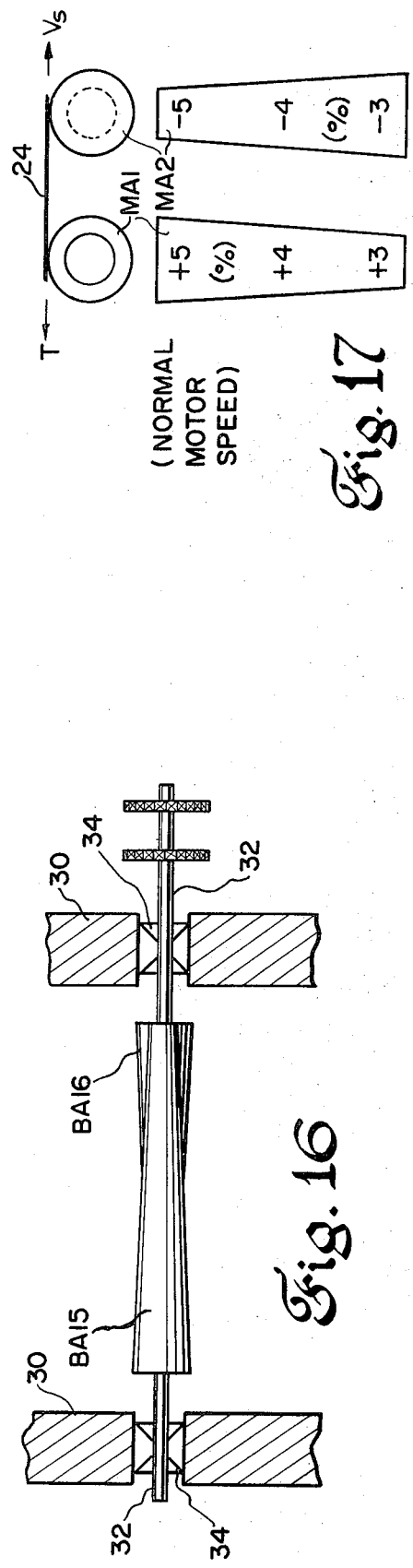

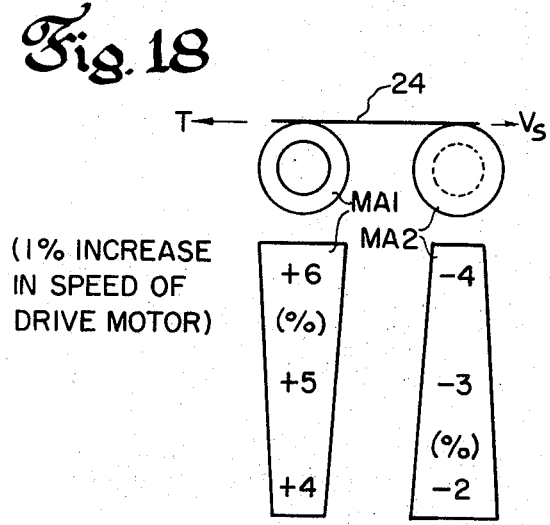
Fig. 18 (1% INCREASE IN SPEED OF DRIVE MOTOR)
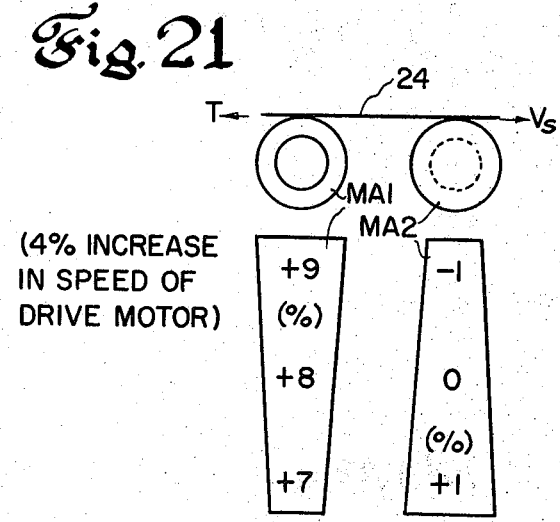
Fig. 21 (4% INCREASE IN SPEED OF DRIVE MOTOR)
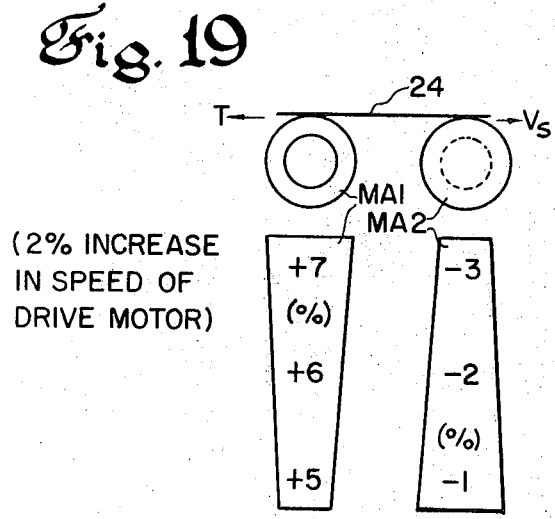
Fig. 19 (2% INCREASE IN SPEED OF DRIVE MOTOR)
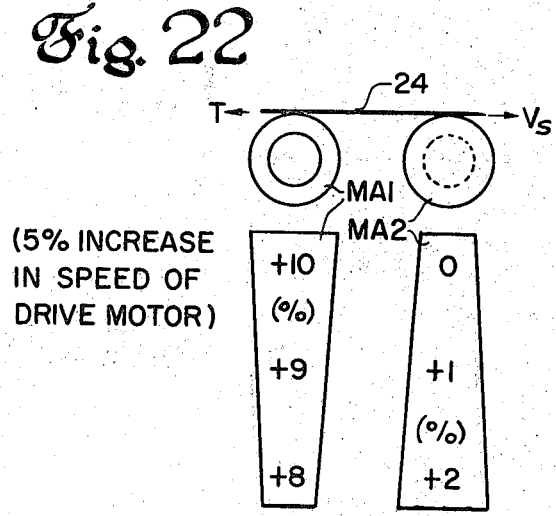
Fig. 22 (5% INCREASE IN SPEED OF DRIVE MOTOR)
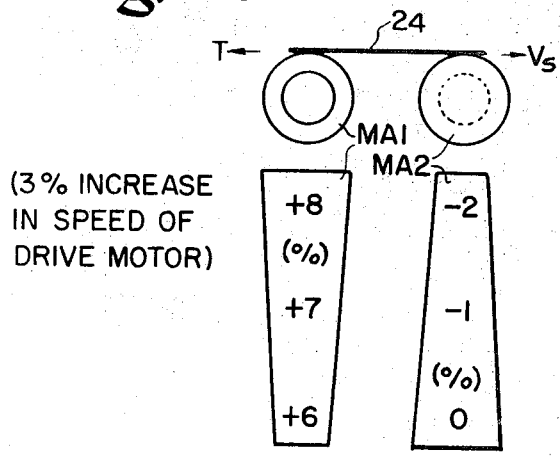
Fig. 20 (3% INCREASE IN SPEED OF DRIVE MOTOR)
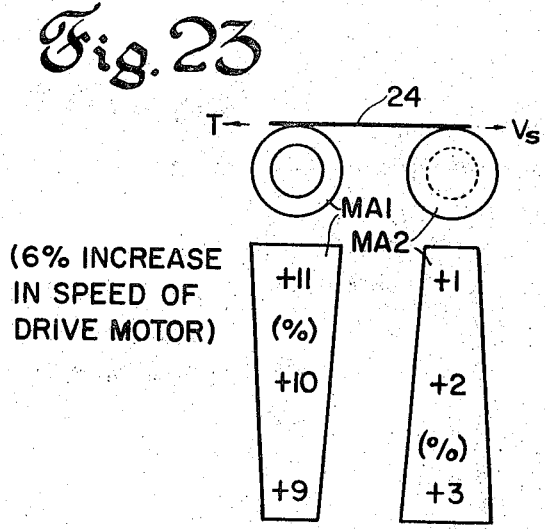
Fig. 23 (6% INCREASE IN SPEED OF DRIVE MOTOR)

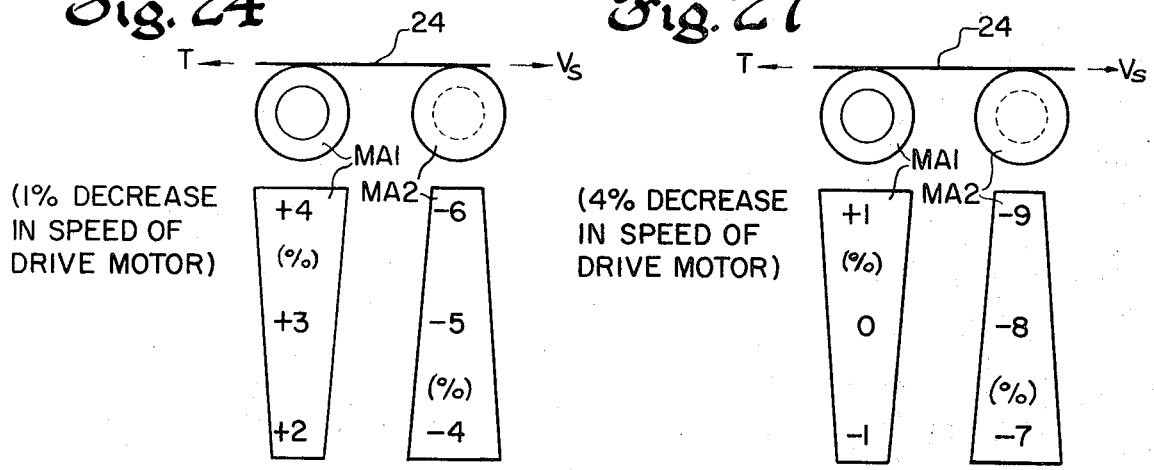
Fig. 24 (1% DECREASE IN SPEED OF DRIVE MOTOR)
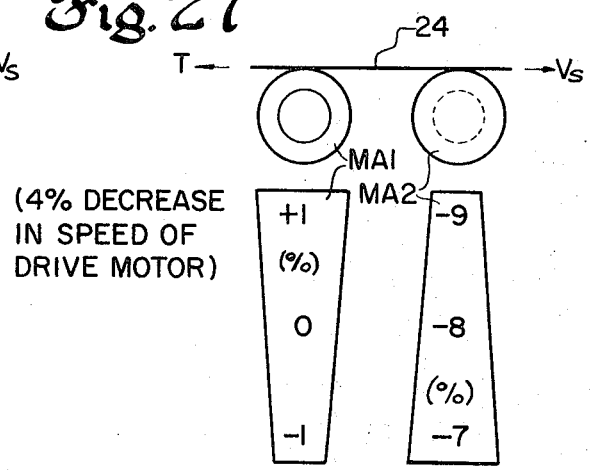
Fig. 27 (4% DECREASE IN SPEED OF DRIVE MOTOR)
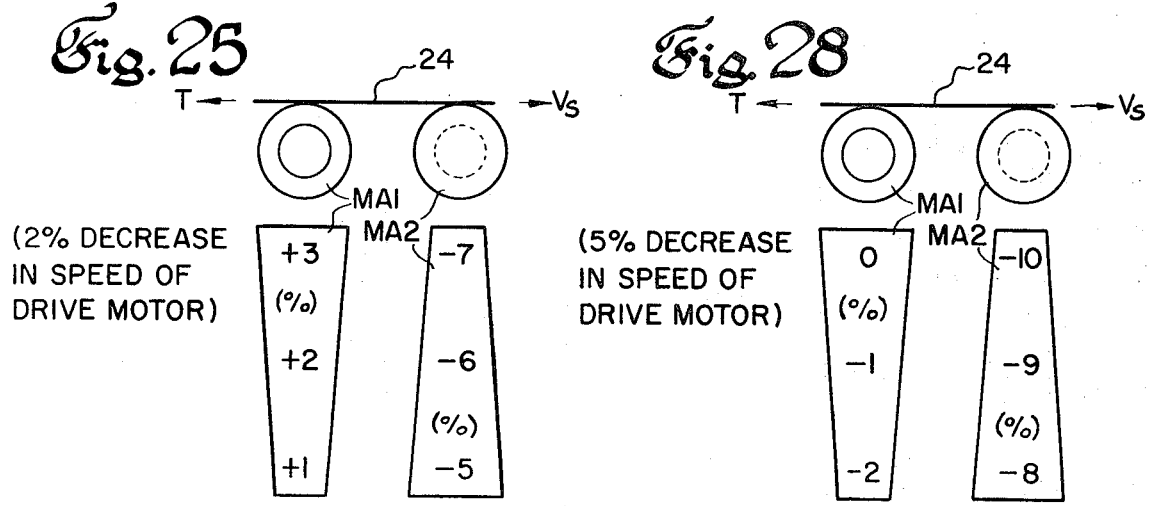
Fig. 25 (2% DECREASE IN SPEED OF DRIVE MOTOR)
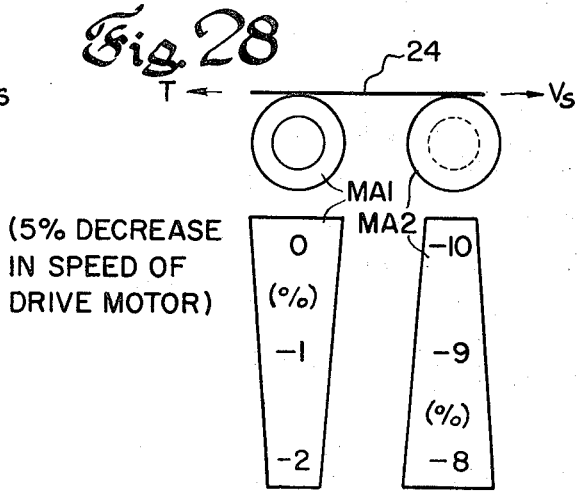
Fig. 28 (5% DECREASE IN SPEED OF DRIVE MOTOR)
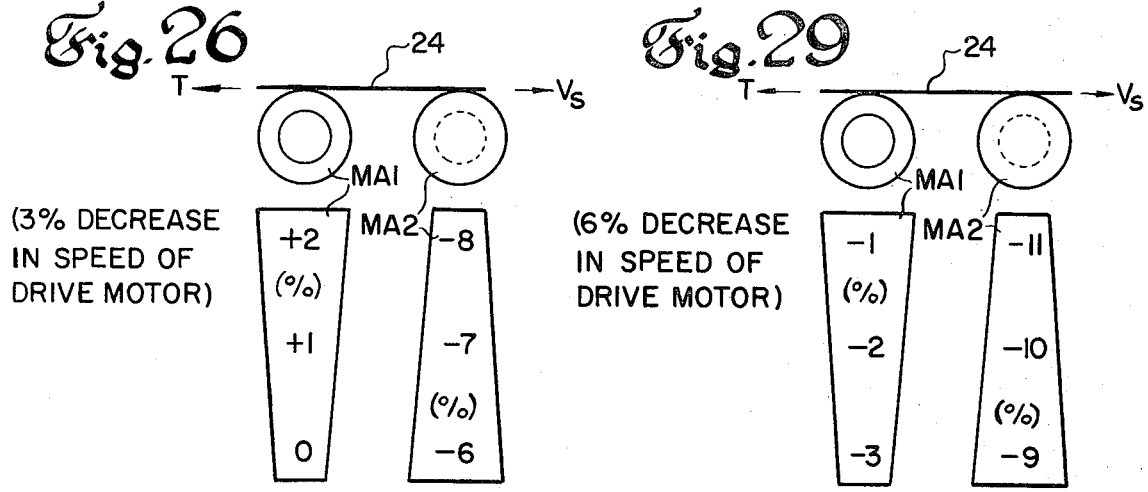
Fig. 26 (3% DECREASE IN SPEED OF DRIVE MOTOR)
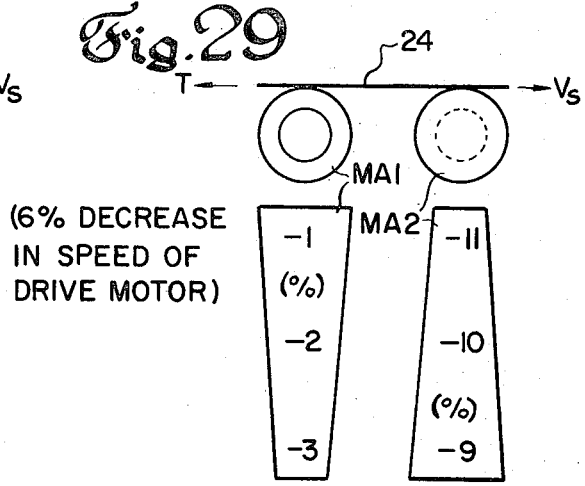
Fig. 29 (6% DECREASE IN SPEED OF DRIVE MOTOR)

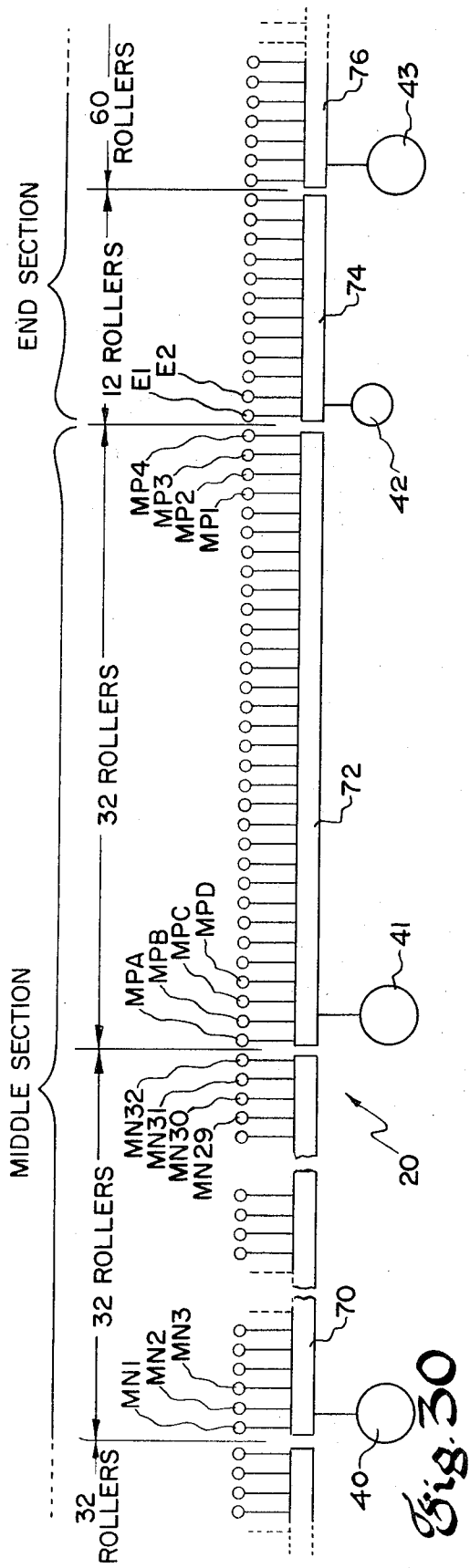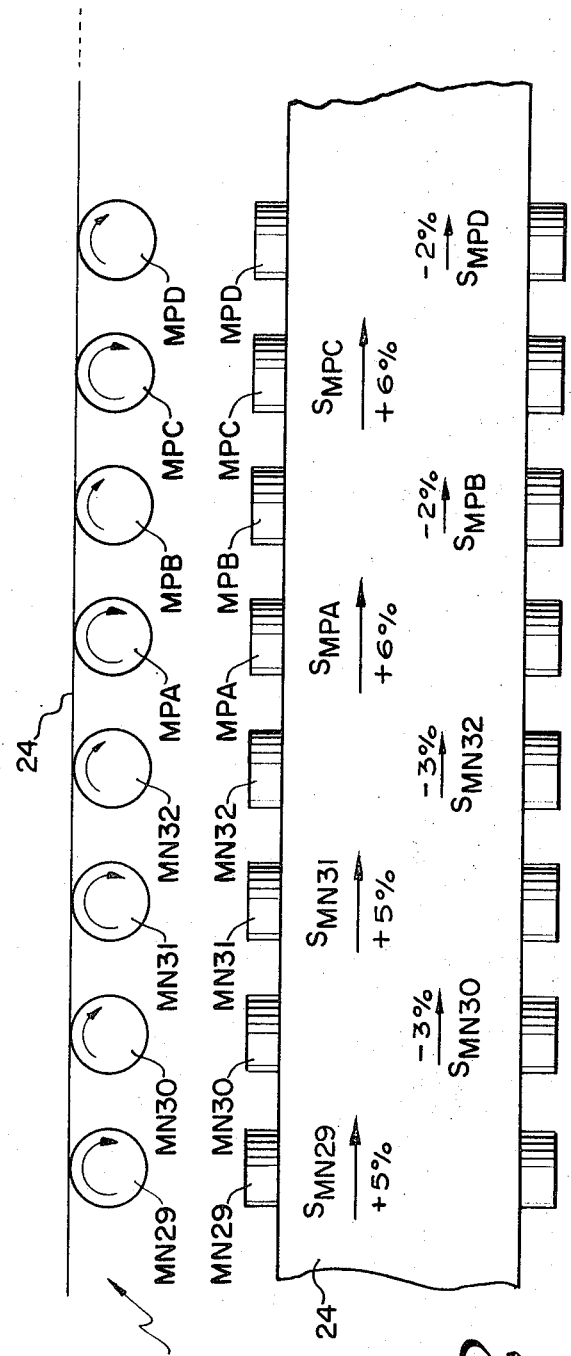
Fig. 30
Fig. 31
Fig. 32

ROLLER CONVEYING OF STRIP MATERIAL

This is a continuation, of application Ser. No. 256,657, filed May 25, 1972, and now abandoned.

BACKGROUND OF THE INVENTION

The subject invention pertains, in general, to conveying elongated sheet, or strip, material by rotation of serially arranged rollers forming a roller-type conveyor on which the strip is supported; and, in particular, to conveying the strip under established tension by independently rotating the serially arranged rollers asynchronously and unidirectionally to produce, inter alia, counteracting frictional forces in the moving strip whereby the established strip tension remains substantially unchanged so that the moving strip neither tears due to increased tension nor corrugates (cobbles) due to decreasing tension so much that the strip is in compression.

Although the invention is hereinafter described in connection with a roller hearth conveyor employed in a heat treating furnace, it is to be understood that the invention may be otherwise employed.

Roller-type conveyors employing rollers which are independently driven by separate drive means are often used for conveying thin sheet or foil materials, such as, for example, long steel sheet or strip. A long strip of such material is supported lengthwise on a series of the independently driven rollers so that each of the rollers contacts and supports the strip at a different part thereof along its length. Frictional forces exerted on the strip at regular intervals by the moving peripheries of the rotated rollers convey the strip toward one end of the series. By using independently driven rollers the strip is moved because of roller rotation. Strip movement is not the primary cause of roller rotation.

Unless longitudinal tension in the long strip is maintained within relatively close limits the strip will tear and/or cobble as it is conveyed by the independently driven rollers in the long series. Control of strip tension is complicated by, among other things, such factors as: roller speed, strip length, strip thickness, characteristics of the strip material, temperature, etc. Tension control becomes increasingly difficult as longer strip is to be conveyed over a greater number of rollers through longer distances. Also, control becomes increasingly important in cases where thinner strip is to be conveyed since it corrugates more easily due to compression. The aforementioned difficulties are compounded in cases where the strip is to be conveyed through environments wherein extreme temperatures prevail; e.g., the elevated temperatures in a heat treating furnace through which the strip is being conveyed.

One application, among others, wherein a long strip of thin material is continuously conveyed over a long series of independently driven rollers is in connection with the conveying of long sheets, or strips, of magnetic silicon steel which are destined for use in transformers, motors, etc. For example, a very long strip (often called a strand) of steel, nominally 0.01 inch thick and about 36 inches wide, is conveyed through a heat treating furnace on a roller hearth conveyor comprising hundreds of independently driven rollers arranged in series and extending along the entire length of the furnace. The hundreds of serially arranged rollers support the entire length of the steel strand. Each roller is about 3 inches in diameter and adjacent rollers are spaced about 9 inches center-to-center. Hence, the series of independently driven rollers extends for a distance of hundreds of feet and the same length of thin flat steel strand is supported on, and conveyed by, the driven rollers. Rotary motion is imparted to the rollers by motors. Frictional forces are exerted on the strip at intervals therealong by the moving peripheries of the rotated rollers and the strand is conveyed along the series of rotating rollers toward one end of the series.

In conveying a relatively short strand on a relatively short conveyor, having relatively few rollers, no insurmountable problems respecting strand tension appear. However, a formidable problem respecting strand tension control appears when hundreds of feet of thin steel strand are to be conveyed over hundreds of rollers through a distance of hundreds of feet. The problem of tension control would still be formidable even if the steel strand and the rollers were not situated in the high temperature environment of a heat treating furnace. The high temperature environment of the furnace creates additional problems, hereinafter discussed, contributing to tension control difficulties.

Ideally, in a very long series of rollers the speed of each roller should be such that it does not develop either too much or too little tension in the strand. For example, if a group of rollers all tend to increase tension in the strand, either the strand will tear behind the group of rollers; or, it will cobble forward of the group of rollers. Torn or cobbled steel strand requires expensive shutdowns. This is especially the case where heat-treating furnaces are involved. In very long conveyors having many rollers it is not practical to provide each roller with its own drive motor and speed regulator. Moreover, if each roller was provided with its own drive motor and regulator the problem of controlling, or regulating, the speed of each motor and roller relative to every other motor and roller would be very difficult. Controlling strip tension by regulating the speeds of drive motors is a formidable problem, even where groups of many adjacently situated rollers are mechanically linked, or coupled, so that each group of rollers is driven by a single drive motor. In a very long conveyor involving hundreds of rollers many groups and many drive motors and regulators would be required. However, it would still be very difficult to control the speed of each drive motor relative to every other drive motor. Moreover, even though many rollers in a group are driven by a single drive motor thereby reducing the number of drive motors to be controlled, all of the driven rollers in a single group do not rotate exactly the same peripheral speed because there are, among other things, physical and mechanical differences such as diameter variations and warping variations among the rollers. For example, all of the rollers are not dimensionally the same. Nor are they identically aligned. Thus, intolerable variations in strip tension can occur.

Conveying thin steel strand through a heat treating furnace (1,240°C) introduces some additional problems, among which is the variation of the speed at which the strip moves through different zones of the furnace. Strip, or strand, velocity varies along the length of the furnace due to two factors: (1) increases in temperature cause the moving strand to expand so that strand velocity is greater in the hotter zones of the furnace than in the cooler zones; (2) in the higher temperature zones of the furnace the strand creeps in length due to tension on the strand as well as to deformation of the strand as it passes over the rollers.

SUMMARY OF THE INVENTION

One object of the invention is to provide a roller-type conveyor which can convey a long strip of thin material over a long distance without tearing or cobbling the strip.

Another object of the invention is to make a substantial reduction in tension variations in a thin strip, or strand, being conveyed over a series of rollers.

Another object of the invention is to minimize the sensitivity of strip tension to the speeds of serially arranged rollers over which the strip is being conveyed.

Another object of the invention is to provide a method of, and apparatus for, conveying a long strip of thin material by the application of nondestructive frictional forces to said strip.

Another object of the invention is to provide a method of, and apparatus for, conveying a long tensioned strip of thin material on a long series of rollers which develop frictional forces with the strip to convey it, but which neither increases or decrease, significantly, the established tension in the strip.

Another object of the invention is to provide a method of, and apparatus for, establishing tension, and maintaining the established tension, in a long strip of thin material being conveyed on a long series of rollers.

Another object of the invention is to provide a method of, and apparatus for, conveying a long strip of thin material on a long series of asynchronously driven rollers.

Another object of the invention is to provide a method of, and apparatus for, conveying strip material on a series of rollers which are asynchronously driven by independent motor means; relatively wide speed variations of said motor means being tolerable.

Another object of the invention is to provide a method of, and apparatus for, safely conveying strip material on a series of rotating rollers even when some of the rollers in said series are stalled.

Another object of the invention is to provide a method of, and apparatus for, conveying a long strip of thin material over long distances at elevated temperatures on a long series of rollers without tearing or cobbling the strip.

In accordance with an illustrative example of the invention a long strip of relatively thin material is supported lengthwise on a series of unidirectionally driven rollers; each roller contacting and supporting a different part of the strip at intervals along its length. Rollers located at opposite ends of the series are driven at different peripheral, or circumferential, speeds thereby initially establishing the velocity $V_s$ and tension $T$ of the conveyed strip. The rest of the rollers are driven so that they have peripheral speeds which are asynchronous relative to the strip velocity $V_s$. That is, some rollers have peripheral speeds which are faster than $V_s$ and others have peripheral speeds which are slower than $V_s$. In other words, the peripheries of some rollers slip faster than, or forward of, the moving strip while the peripheries of other rollers slip slower than, or behind, the moving strip. Substantially equal but oppositely directed frictional forces are developed in the moving strip by the faster and slower slipping rollers so that the tension $T$ in the strip is not substantially changed. Consequently, the strip neither tears nor cobbles. Ordinarily, the speeds of motors driving groups of the asynchronously rotated rollers are set to cause the rollers to have an average peripheral speed equal to the strip velocity $V_s$. However, variations in motor speed, and resulting peripheral roller speeds, are tolerable because the magnitudes of the frictional forces developed in the moving strip by the rotating rollers are relatively independent of the slip speeds of the asynchronously rotating rollers. In addition, the speeds of motors driving selected groups of the asynchronously rotated rollers may be varied deliberately for such purposes as: gradually establishing tension $T$ in the strip; and, applying sufficient frictional force to the moving strip at a selected portion thereof along its length to pull, or drag, the entire strip past one or more groups of stalled rollers without damaging the said one In some illustrative examples of the invention cylindrical rollers are employed. In other illustrative examples, frustro-conical rollers are employed.

One feature of the invention relates to the recognition and employment of the fact that the magnitude of the frictional force developed between the moving periphery of a roller and a moving strip contacting said moving periphery is relatively independent of the difference (i.e., slip speed, or slip) between the strip velocity and the peripheral speed of the roller. Therefore, the rollers in a series of rollers are unidirectionally and asynchronously driven by independent motor means so that some rollers have peripheral speeds faster than the strip velocity and slip forward (faster) of the strip while other rollers have peripheral speeds slower than the strip velocity and slip behind (slower) the strip. The frictional forces developed in the strip by the faster slipping rollers are of substantially the same magnitude as those developed in the strip by the slower slipping rollers. However, the frictional forces developed by the faster slipping rollers are oppositely directed in the strip with respect to the frictional forces developed therein by the slower slipping rollers. Consequently, strip tension is neither increased or decreased.

Another feature of the invention relates to unidirectionally and asynchronously rotating the rollers in the series so that, normally, the average peripheral speed of the faster and slower slipping rollers is substantially the same as the strip velocity $V_s$; i.e, the average peripheral speed of pairs, or sets, of faster and slower slipping rollers is substantially the same as the strip velocity $V_s$ and is substantially synchronous with respect to $V_s$. As a result, the established strip velocity $V_s$ remains substantially the same even though few, if any, of the rollers in the series rotate in synchronism with the moving strip.

Another feature of the invention relates to unidirectionally and asynchronously rotating the rollers in the series so that even if the speeds of the motor means driving the rollers should vary, within limits, the frictional forces developed by pairs, or sets, of faster and slower slipping rollers will, nevertheless, substantially cancel each other and the tension $T$ in the moving strip, or strand, will not be significantly changed.

Another feature of the invention relates to the capability of changing the speeds of the motor means driving the unidirectionally and asynchronously rotated rollers so that the tension $T$ in the strip or strand may be gradually established at a preselected magnitude.

Another feature of the invention relates to the capability of establishing different speeds for different motor means driving selected groups of unidirectionally and asynchronously rotated rollers so that the moving strip, or strand, may be pulled, or dragged, without damage thereto past one or more groups of stalled rollers.

Another feature of the invention relates to establishing strip velocity $V_s$ by driving rollers located at the exit end, or section, of the series of rollers at constant peripheral speeds.

Another feature of the invention relates to the establishment of tension $T$ in the strip, or strand, by driving rollers located at the beginning, or entrance, section of the series of rollers at peripheral speeds which are slower than the strip velocity $V_s$.

Another feature of the invention relates to the employment, in some of the illustrative examples hereinafter appearing, of tapered frustro-conical rollers which enable smoother transitions in the net effect of a group of rollers from retarding the moving strip, or strand, passing over the slipping rollers in the series to applying a zero net force and finally to pushing the moving strip along.

Other objects and features, as well as the many advantages of the invention, appear hereinafter whereat the invention is disclosed by means of illustrative examples thereof and with reference to accompanying drawing figures.

DRAWINGS

FIG. 1 is a diagrammatic elevation view showing, among other things, some of the many rollers of a long roller hearth conveyor and a thin steel strand supported on and being conveyed on said rollers, the conveyor being situated within a long heat treating furnace.

FIG. 2 is a perspective view of the roller hearth conveyor of FIG. 1 showing some of the rollers thereof and the steel strand supported thereon and being conveyed therealong FIG. 3 is another perspective view of the roller hearth conveyor of FIGS. 1 and 2 showing some of the rollers thereof and some drive motors and chain-and-sprocket drive arrangements for driving groups of the rollers.

FIG. 4 is a cross section view, in elevation, viewed along the section line 4—4 of FIG. 1 and showing one of the rollers MP2 mounted by means of journal bearings for rotation within the environment of the heat treating furnace.

FIG. 5 is a diagrammatic view showing a number of cylindrical rollers of different diameters supporting the steel strand.

FIG. 6 is a diagrammatic elevation view showing some of the rollers of the roller hearth conveyor supporting and conveying the thin steel strand; pairs of adjacently situated rollers being unidirectionally and asynchronously rotated by independent drive means such that, in each pair, one roller has a peripheral speed faster than the strand velocity and the other roller has a peripheral speed slower than the strand velocity.

FIG. 7 is a diagrammatic plan view of the rollers and conveyed steel strand of FIG. 6.

FIG. 8 is a diagrammatic elevation view showing some of the rollers of the roller hearth conveyor supporting and conveying the thin steel strand; adjacently located sets of four rollers being unidirectionally and asynchronously rotated by independent drive means such that, in each set of four rollers, two adjacent rollers have peripheral speeds which are faster than the strand velocity and the other two adjacently located rollers have peripheral speeds which are slower than the strand velocity.

FIG. 9 is a diagrammatic plan view of the rollers and conveyed strand of FIG. 8.

FIG. 10 is a diagrammatic elevation view showing some of the rollers of the roller hearth conveyor supporting and conveying the thin steel strand; adjacently located sets of six rollers being unidirectionally and asynchronously rotated by independent drive means such that, in each set of six rollers, three sequentially located rollers have peripheral speeds which are faster than the strand velocity and the other three sequentially located rollers have peripheral speeds which are slower than the strand velocity.

FIG. 11 is a diagrammatic plan view of the rollers and conveyed strand of FIG. 10.

FIG. 12 is a tabulation showing the percent slip speed which occurs at the pair of rollers MN1 and MN2 (shown in diagrammatic elevation view) when the motor driving the group of rollers including this pair of rollers experiences speed increases ranging from +1% to +6% in incremental increases of 1%; the pair of rollers MN1 and MN2 being operated in accordance with the method illustrated in FIG. 6 and having nominal peripheral speeds of +4% and −4% respectively in relation to strand speed.

FIG. 13 is a tabulation showing the percent slip speed which occurs at the pair of rollers MN1 and MN2 (shown in diagrammatic elevation view) when the motor driving the group of rollers including this pair of rollers experiences speed decreases ranging from −1% to −6% in incremental decreases of 1%; the pair of rollers MN1 and MN2 being operated in accordance with the method illustrated in FIG. 6 and having nominal peripheral speeds of +4% and −4% respectively in relation to strand speed.

FIG. 14 is a diagrammatic elevation view of a conveyor, similar to the conveyor illustrated in FIG. 1, showing some of the rollers thereof supporting and conveying thin steel strand; the rollers illustrated are tapered, or frustro-conical, rollers and pairs of adjacently situated rollers are unidirectionally and asynchronously rotated by independent drive means such that, in each pair, one roller has a peripheral speed faster than the strand velocity and the other roller has a peripheral speed slower than the strand velocity.

FIG. 15 is a diagrammatic plan view of the rollers and conveyed strand of FIG. 14.

FIG. 16 is a cross section view, in elevation, viewed along the section line 16—16 in FIG. 15 and showing frustro-conical rollers mounted for rotation in journal bearings within the environment of a heat treating furnace, such as the heat treating furnace illustrated in FIG. 1.

FIG. 17 is a diagrammatic view showing a pair of asynchronously rotated frustro-conical rollers MA1 and MA2 of FIG. 14, in elevation and plan views, and illustrating in percentages the peripheral slip speeds, or slips, at different locations on the tapered peripheries of the rollers when the motor driving the roller group including the pair is at its normal operating speed.

In the example in FIG. 17, the roller taper is such that the larger diameter end goes a percent faster and the smaller diameter end goes a percent slower than the middle. The taper can be larger or smaller than this without changing the character of a frustro-conical roller.

FIG. 18 is a diagrammatic view, similar to FIG. 17, illustrating in percentages the peripheral slip speeds, or slips, at different locations on the tapered peripheries of the pair of rollers MA1 and MA2 when the speed of the drive motor increases by 1% from its normal operating speed. In this case roller MA1 pulls the strip and roller MA2 retards it so there is no net effect from the pair of rollers.

FIG. 19 is a diagrammatic view, similar to FIG. 17, illustrating in percentages the peripheral slip speeds, or slips, at different locations on the tapered peripheries of the pair of rollers MA1 and MA2 when the speed of the drive motor increases by 2% from its normal operating speed. Again, the pull of roller MA1 on the strip is balanced by the retardation of roller MA2.

FIG. 20 is a diagrammatic view, similar to FIG. 17, illustrating in percentages the peripheral slip speeds, or slips, at different locations on the tapered peripheries of the pair of rollers MA1 and MA2 when the speed of the drive motor increases by 3% from its normal operating speed. Again the pull of roller MA1 balances the retardation of the strip by roller MA2.

FIG. 21 is a diagrammatic view, similar to FIG. 17, illustrating in percentages the peripheral slip speeds, or slips, at different locations on the tapered peripheries of the pair of rollers MA1 and MA2 when the speed of the drive motor increases by 4% from its normal operating speed. It should be noted in this case that on the average roller MA2 has a peripheral speed equal to the strip speed and that therefore it neither pulls or retards the strip. Roller MA1 on the other hand has a peripheral speed which exceeds strip speed at all points. It therefore pulls the strip along.

FIG. 22 is a diagrammatic view, similar to FIG. 17, illustrating in percentages the peripheral slip speeds, or slips, at different locations on the tapered peripheries of the pair of rollers MA1 and MA2 when the speed of the drive motor increases by 5% from its normal operating speed. It should be noted in this case that both roller MA1 and MA2 have peripheral speeds exceeding strip speed and therefore both pull the strip along.

FIG. 23 is a diagrammatic view, similar to FIG. 17, illustrating in percentages the peripheral slip speeds, or slips, at different locations on the tapered peripheries of the pair of rollers MA1 and MA2 when speed of the drive motor increases by 6% from its normal operating speed. Again both roller MA1 and MA2 pull the strip along.

FIG. 24 is a diagrammatic view, similar to FIG. 17, illustrating in percentages the peripheral slip speeds, or slips, at different locations on the tapered peripheries of the pair of rollers MA1 and MA2 when the speed of the drive motor decreases by 1% from its normal operating speed. In this case, the pull of roller MA1 on the strip is balanced by the retardation of roller MA2.

FIG. 25 is a diagrammatic view, similar to FIG. 17, illustrating in percentages the peripheral slip speeds, or slips, at different locations on the tapered peripheries of the pair of rollers MA1 and MA2 when the speed of the drive motor decreases by 2% from its normal operating speed. Again the pull of roller MA1 on the strip is balanced by the retardation of roller MA2.

FIG. 26 is a diagrammatic view, similar to FIG. 17, illustrating in percentages the peripheral slip speeds, or slips, at different locations on the tapered peripheries of the pair of rollers MA1 and MA2 when the speed of the drive motor decreases by 3% from its normal operating speed. Again, the pull of roller MA1 on the strip is balanced by the retardation of roller MA2.

FIG. 27 is a diagrammatic view, similar to FIG. 17, illustrating in percentages the peripheral slip speeds, or slips, at different locations on the tapered peripheries of the pair of rollers MA1 and MA2 when the speed of the drive motor decreases by 4% from its normal operating speed. Now roller MA1 neither pulls or retards the strip while roller MA2 retards the strip.

FIG. 28 is a diagrammatic view, similar to FIG. 17, illustrating in percentages the peripheral slip speeds, or slips, at different locations on the tapered peripheries of the pair of rollers MA1 and MA2 when the speed of the drive motor decreases by 5% from its normal operating speed. Now both roller MA1 and roller MA2 retard the strip.

FIG. 29 is a diagrammatic view, similar to FIG. 17, illustrating in percentages the peripheral slip speeds, or slips, at different locations on the tapered peripheries of the pair of rollers MA1 and MA2 when the speed of the drive motor decreases by 6% from its normal operating speed. Again roller MA1 and roller MA2 retard the strip.

FIG. 30 is a diagrammatic elevation view showing some of the rollers of the MIDDLE and END sections of the roller hearth conveyor of FIG. 1 as well as some of the drive motors and chain-and-sprocket drive mechanisms driving groups of the rollers; the asynchronous peripheral speeds of rollers in the different roller groups being different so as to enable the conveyed strand to be pulled, or dragged, past a group of stalled rollers.

FIG. 31 is a diagrammatic elevation view showing some of the rollers in each of two adjacent roller groups of the roller hearth conveyor of FIG. 1 supporting and conveying the thin steel strand. In each roller group pairs of adjacently situated rollers are unidirectionally and asynchronously rotated by independent drive means such that, in each pair, one roller has a peripheral speed faster than the strand velocity and the other roller has a peripheral speed slower than the strand velocity. However, each pair of rollers in one of the roller groups has an average peripheral speed which is different than the average peripheral speed of each pair of rollers in the adjacent roller group. Such differences enable the steel strand to be pulled, or dragged, past one or more groups of stalled rollers in the conveyor.

FIG. 32 is a diagrammatic plan view of the rollers and conveyed steel strand of FIG. 31.

DETAILED DESCRIPTION

Illustrated in FIGS. 1–4 is a roller hearth conveyor designated, generally, by the reference number 20. The conveyor 20 is situated within a longitudinally extending heat treating furnace 22. The furnace 22 is intended for annealing thin steel strand 24, or strip. In the hottest zone of the furnace 22 a temperature of approximately 1,240°C is reached. Suitable refractory materials are used to form a roof 26, a hearth 28 and side walls 30 of the furnace 22. The furnace 22 extends substantially horizontally over a distance of many hundreds of feet. Similarly, the conveyor 20 extends substantially horizontally for many hundreds of feet. For convenience of illustration the very long furnace 22 is shown in FIG. 1 with a number of breaks along its length. Also, for convenience of illustration, the very long conveyor 20 is illustrated throughout the drawing figures with a number of breaks along its length.

The long thin steel strand 24 is nominally 0.01 inch thick and approximately 36 inches wide. It is known as magnetic silicon sheet steel or flat-rolled electrical steel. Continuous strip, or strand, 24 is conveyed on the driven rollers of the conveyor 20 through the furnace 22 wherein it is annealed and, ultimately, the strand 24 exits from the furnace on the END SECTION rollers, as indicated at FIG. 1. Subsequently, the annealed strand 24 is suitably cut and punched into sheets, or laminations, which are used in transformers, motors, etc. The very long thin steel strand 24 is supported along its length on the peripheries of a number of serially arranged rollers B1 ... EN2 which extend substantially horizontally from one end of the furnace 22 to an opposite end thereof. As illustrated, the peripheries of each of the rollers B1 ... EN2 contacts the relatively flat underside of the strand 24 at more or less regular intervals therealong.

The roller hearth conveyor 20 is, as indicated at FIG. 1, comprised of three consecutively arranged conveyor sections designated as: BEGINNING, MIDDLE, and END sections. Each of the aforesaid sections is comprised of a plurality of rollers arranged in series and extending more or less horizontally. As shown, the BEGINNING section is comprised of the rollers B1, B2, B3, B4. .. BN. The MIDDLE section is comprised of the rollers M1, M2, M3, M4 ... MN1, MN2, MN3, MN4 ... MP1, MP2, MP3, and MP4. The END section is comprised of the rollers E1, E2 ... EN1 and EN2. Each of the rollers B1 ... EN2 is a cylindrical or a frusto-conical roller which, as shown in FIGS. 2, 3 and 4, is driven by a longitudinal shaft 32. Each shaft 32 is mounted for rotation in journal bearings 34 which are mounted in the walls 30 of the furnace 22. See FIGS. 3 and 4. Each of the rollers is about 3 inches in diameter and adjacent rollers are horizontally spaced at 9 inch intervals, center-to-center. The BEGINNING section of conveyor 20 is comprised of N rollers, B1 ... BN; N representing 32 rollers. The MIDDLE section of the conveyor 20 is comprised of 1216 rollers, M1. .. MP4. Finally, the END section of the conveyor 20 is comprised of 72 rollers, E1 ... EN2. Because of the extreme length of the conveyor 20 only a few of the rollers, hereinbefore identified, in the BEGINNING, MIDDLE and END sections are illustrated in FIGS. 1 and 2. The rollers in the cooler portions of the BEGINNING and END sections have steel peripheries and the rollers in the hot MIDDLE section have ceramic peripheries; e.g., alumina. For sliding contact between the silicon steel strand 24 and a roller having a steel periphery the coefficient of friction is approximately ¼. For sliding contact between the silicon steel strand 24 and a roller having an alumina periphery in a high temperature hydrogen atmosphere the coefficient of friction is approximately one. The relationships among strip tension, on frictional force and the peripheral speeds of various rollers is discussed hereinafter.

In the BEGINNING (entrance) section the 32 rollers, B1 ... BN, are arranged in three consecutive groups of serially arranged rollers; the three groups having 12, 10 and 10 rollers, respectively. Each of the three groups is provided with an individual D.C. drive motor. In the very lengthy MIDDLE (intermediate) section the 1,216 rollers, M1 ... MP4, are arranged in 38 consecutive groups of serially arranged rollers; each of the 38 groups having 32 rollers therein. Each group, in the 38 MIDDLE groups, is provided with an individual D.C. drive motor. Finally the END (exit) section has 72 rollers, E1 ... EN2, which are arranged in two consecutive groups of serially arranged rollers; the two groups having 12 to 60 rollers, respectively. Each of the two end groups is provided with an individual D.C. drivemotor. Thus, overall, the roller hearth conveyor 20 is comprised of 1,320 rollers, B1 ... EN2, arranged in three conveyor sections (BEGINNING, MIDDLE and END) having a total of 43 roller groups and 43 drive motors. Because the conveyor 20 is so long, reasons of convenience, and clarity consistent therewith, dictate that only some of the rollers in the three sections be illustrated in FIGS. 1 and 2. For the same reasons FIG. 3 is an illustration of only some of the rollers of the MIDDLE and END sections as well as some of the drive motors and associated chain-and-sprocket drive arrangements associated with some of the roller groups.

In FIG. 3 some rollers and associated drive motors and drive arrangements in the MIDDLE and END sections of the conveyor 20 are illustrated. For example, 32 rollers (MN1, MN2, MN3, MN4 ... ) in the MIDDLE section are independently rotated or driven, by a D.C. drive motor 40. Similarly, another group of 32 MIDDLE section rollers ( ... MP1, MP2, MP3 and MP4) are independently rotated by a D.C. drive motor 41. Also, a group of 12 END section rollers E1, E2 ... are independently rotated by a D.C. drive motor 42. As stated hereinbefore and as indicated in FIG. 3 each roller group in the conveyor 20 has a drive motor, like the drive motor 40, associated therewith. In addition, there is a chain-and-sprocket drive arrangement, or mechanism, intermediate the drive motor and the rollers of each roller group. For example, as shown in FIG. 3, the drive motor 40 (with an associated speed reduction not shown) is directly coupled for rotation to the shaft 32 of the roller MN1 in the MIDDLE section of rollers. Electrical energization of the D.C. motor 40 rotates the shafts 32 and the roller MN1, which thereby rotates in the direction indicated by the circular arrow in FIG. 3. The rotating shaft 32 also turns a sprocket wheel 42 in the same clockwise direction; the sprocket wheel 42 being suitably keyed to shaft 32 for rotation therewith. Thus, the shaft 32 and sprocket wheel 42 rotate in the same clockwise direction at the same angular speed because of the primary rotation of the motor 36. The sprocket wheel 42 has a drive chain 44 thereabout which mechanically links the sprocket wheel 42 with another sprocket wheel 46. The rotated sprocket wheel 42 drives the chain 44 and causes the sprocket 46 to rotate in the same clockwise direction as the sprocket wheel 42. Chain-and-sprocket drive arrangements are conventional and well known mechanisms. The clockwise rotated sprocket wheel 46 is keyed to the shaft 32 which drives the roller MN2 and rotates it in a clockwise direction. Another sprocket wheel 48 is keyed to the shaft 32 of the roller MN2 and it, too, is rotated in unison with the roller MN2 in a clockwise direction. Another drive chain 50 mechanically links the sprocket wheel 48 for rotation with another sprocket wheel 52 which is keyed to the shaft 32 which drives the roller MN3. Thus, the rotated sprocket wheel 52, being keyed to shaft 32 of the roller MN3, is effective in rotating the roller MN3. On shaft 32 of the roller MN3 another sprocket wheel 54 and drive chain 56 are driven in the manner hereinbefore described so that, ultimately, the next roller MN4 is rotated in a clockwise direction. This action continues so that all 32 rollers in the group of rollers are rotated clockwise. Thus, one D.C. drive motor 36 and sequence of chain-and-sprocket drive mechanisms are effective to drive all 32 of the motors in the particular roller group. Similarly, the drive motor 41 is effective in the same manner and with the same means to drive another 32 rollers comprising a single group of rollers in the MIDDLE section. As stated hereinbefore, the MIDDLE SECTION OF ROLLER GROUPS is comprised of 38 groups, each group having 32 rollers therein. Each group has its own drive motor. Therefore, 38 drive motors are involved. Also shown in FIG. 3 is a representative D.C. drive motor 42 which is operable for driving a group of 12 of the rollers in the END section. For example, the motor 42 drives 12 of the rollers, beginning with the rollers E1 and E2. The rollers E1 and E2, as illustrated, also have chain-and-sprocket wheels coupling, or mechanically linking, adjacent rollers. A final group of the END section rollers comprising 60 rollers and including the rollers EN1 and EN2 are driven by a separate D.C. drive motor (not shown). The final group of rollers including the rollers EN1 and EN2 have sprocket wheels and drive chains. Each of the drive motors directly rotates a particular roller shaft and a sprocket wheel thereon. The rotated sprocket wheel advances an associated chain to operate a sprocket wheel on the shaft of an adjacent roller.

For reasons of convenience, and clarity consistent therewith, none of the BEGINNING section rollers B1 ... BN or the various drive motors associated therewith are illustrated in FIG. 3. Not shown in FIG. 3 are the three roller groups of the BEGINNING section totalling 32 rollers; the three groups having 12, 10 and 10 rollers, respectively. In the BEGINNING section there are three drive motors associated with the three groups aforementioned. Each of the drive motors directly rotates a particular roller shaft and a sprocket wheel thereon. The rotated sprocket wheel advances an associated chain to operate a sprocket wheel on the shaft of an adjacent roller.

The relative angular and peripheral speeds of the various rollers, sprocket wheels, etc. in the different roller groups and conveyor sections are discussed hereinafter with reference to appropriate drawing figures illustrating various ways of operating the roller hearth conveyor 20.

The thin steel strand 24 extends horizontally over all of the rollers B1 ... EN2. The entire length of the steel strand 24 within the furnace 22, which is supported on the roller hearth conveyor 20, is approximately 989 feet. This is based on the use of a total of 1,320 rollers which are spaced apart at the intervals of 9 inches, center-to-center. The periphery of each roller contacts and supports the strand 24 at a different place along its length. All 60 rollers, driven by motor 43 at the end of E1 ... EN2, in the END section are rotated at the same peripheral speed to establish the longitudinal velocity of the strip 24, or strand, in a direction toward the END section of the conveyor 20; that is, in a direction from left to right in FIG. 1. The 12 rollers driven by motor 42 may be driven either faster or slower than strip speed depending on the desired tension profile in the strip. More particularly, the last group of 60 cylindrical rollers, respectively, in the END section (i.e., at the end of rollers E1, E2 ... and EN1, EN2) are rotated by motor 43 at the same angular speed. The moving peripheries of the rotating END section rollers E1 ... EN2 exert frictional forces on the relatively flat undersurface of the strand 24 at intervals therealong. Clockwise rotation of the rollers E1 ... EN2 and the exerted frictional forces directed from left to right in the orientation shown in FIG. 1 cause the entire strand 24 to move in the same direction at a velocity which is the same as the substantially constant peripheral speed of the motor 43 driven rollers i.e., the last 60 of E1 ... EN2. More particularly, the strand velocity, designated as $V_s$ in FIGS. 2, 6 and 7 and elsewhere in the drawing figures, is established by the frictional contact occurring between the last 60 clockwise-rotated END section rollers and the relatively flat under surface of the strand 24 in contact with said rollers. The last 60 of rollers E1 ... EN2 do not slip with respect to the moving strand 24. That is, the peripheral speeds of the last 60 of rollers E1 ... EN2 are synchronous relative to the strand velocity $V_s$; the strand velocity $V_s$ being the same as the peripheral speed of the last 60 of rollers E1 ... EN2. In practice, however, all of the last 60 of rollers E1 ... EN2 will not have exactly the same peripheral speeds. Dimensional differences and alignment differences, among others, cause the peripheral speeds of the last 60 of rollers E1 ... EN2 to differ, at least slightly, from roller to roller. Thus, the strand velocity $V_s$ will tend to be the same as the average, or mean peripheral speed of the last 60 of rollers E1 ... EN2.

Simultaneously, the rollers in the BEGINNING section, B1 ... BN, are also rotated by independent means in a clockwise direction. More particularly, all 32 rollers B1 ... BN in the three roller groups in the BEGINNING section are rotated by three drive motors associated therewith such that each roller group may have, in accordance with one way of practicing the invention, a nominal peripheral speed which is slower than the strip velocity $V_s$; e.g., 6% slower. Inasmuch as the rollers B1 ... BN can have slower peripheral speeds than the velocity $V_s$ of the strand 24, the strand 24 has a slip velocity, or slip, relative to the slower peripheral speed of the rollers B1 ... BN. This slip velocity, or slip, is equal to the difference between the strand velocity $V_s$ and the peripheral speed of the rollers B1 ... BN. Since the moving strand 24 has a slip velocity (i.e., 6% faster) relative to the rollers B1 ... BN of the BEGINNING section of rollers, it is, in effect, dragged over the rollers B1 ... BN. Consequently, the rollers B1 ... BN, although rotating in a clockwise direction, can exert a retarding frictional drag on the strand 24. In other words, the slower moving peripheries of the rollers B1 ... BN cause the faster moving strand 24 to be retarded due to the frictional drag exerted thereon. As a result, the BEGINNING section rollers B1 ... BN are effective to establish tension T in the moving strand 24. The sum of the retarding frictional forces, or the drag, exerted by the slower moving peripheries of the rollers B1 ... BN on the faster moving strand 24 is designated in FIG. 2, among other places, by the force vector $T$ which, as shown, is longitudinally directed along the strand 24 in a direction opposite the longitudinal movement $V_s$ of the strand 24; the movement of the strand being designated in FIG. 2, among other places, by the velocity vector $V_s$. The retarding force $T$, or tension, is equal and opposite to the roller exerted forces which move the strand 24 in the direction shown by the velocity vector $V_s$. Thus, the strand 24 moves under tension $T$ in equilibrium (without the influence thereon of unbalanced forces) at constant velocity $V_s$. Accordingly, the peripheral speeds of the rollers B1 ... BN (BEGINNING section) are asynchronous (i.e., 6% slower) relative to both strip velocity $V_s$ and to the peripheral speed of the last 60 of rollers E1 ... EN2 (END section).

Simultaneously with the aforementioned independent rotation of the rollers in the BEGINNING and END sections, all of the 1,216 rollers of the MIDDLE section are also independently rotated in the same clockwise direction. That is, 38 drive motors and their associated chain-and-sprocket drive mechanisms, hereinbefore discussed, rotate the rollers M1 ... MP4 in 38 groups; there being 32 rollers in each of the 38 groups. The rollers M1 ... M4 represent one group; the rollers MN1 ... MN4 represent another group; and, the rollers MP1 ... MP4 represent another group. Again, because the roller hearth conveyor 20 is so long, reasons of convenience, and clarity consistent therewith, dictate that only some of the rollers in but a few of the groups in the MIDDLE section be illustrated.

Thus, with all of the rollers B1 ... EN2 in the BEGINNING, MIDDLE and END sections of the roller hearth conveyor 20 being rotated in a clockwise direction to advance the strand 24 at the established velocity $V_s$ and tension $T$ where exists the danger of tearing or corrugating (cobbling) the strand because of excessive tension or too little tension thereon. The MIDDLE section of the conveyor 20 includes 1,216 rollers which extend approximately 911 feet in a horizontal direction. Hence, control of strip, or strand, tension over the MIDDLE section might be very difficult in view of the: lengthy distance involved (911 feet), large number of rollers (1,216), many roller groups (38) involved and the many drive motors (38) invovled. Tension control is further complicated by the fact that the strand 24 and roller hearth conveyor 20 are located in the elevated temperatures of the furnace 22. The thermal disturbances introduced have been discussed hereinbefore. Suffice it to say that the strand 24 undergoes, among other things, dimensional changes as it is being conveyed through the furnace 22. Advantageously, the novel method, hereinafter described, of asynchronously rotating the rollers obviates the necessity for controlling roller speed closely. In addition, employment of the novel method of the invention permits some variation in drive motor speeds.

In the very lengthy MIDDLE section of the conveyor 20, the rollers M1 ... MP4 are rotated clockwise by their independent drive motors and chain-and-sprocket drive arrangements in accordance with a novel methodology. The novel method involves recognition of the fact that the frictional force developed between the moving strand 24 and each rotating roller M1 ... MP4 is approximately the same as the weight of the strand between a pair of the rollers when the speed $V_s$ of the strand and the peripheral speed of the particular roller is not in synchronism; i.e., when there is slip between the moving strand 24 and the periphery of the particular rotating roller. Normally, the aforesaid frictional force, developed at the particular roller, is of a relatively low magnitude. In addition, the novel method takes recognition of the fact that the aforesaid frictional force is relatively insensitive to slip velocity or to its direction. Although the frictional force changes direction when the slip velocity, or slip, changes direction, the magnitude of the frictional force is changed only negligibly. The novel method is exemplified in FIGS. 6 and 7 wherein the MIDDLE section rollers M1 ... MP4 are illustrated. According to the invention all 1,216 rollers M1 ... MP4 in the MIDDLE section are rotated clockwise in such a way that in each pair of adjacently situated rollers one roller has a peripheral speed which is a little faster than the strand velocity $V_s$ and the other roller in the same pair has a peripheral speed which is a little slower than the strand velocity. For example, as shown in FIGS. 6 and 7, for the pair of rollers M1 and M2 the roller M1 has a peripheral speed $S_{M1}$ which is a little faster than the strand velocity $V_s$ while the roller M2 has a peripheral speed $S_{M2}$ which is a little slower than the strand velocity $V_s$. The peripheral speeds $S_{M1}$ and $S_{M2}$ are faster and slower, respectively, than strand velocity $V_s$ by about the same percentage. For example, the peripheral speed $S_{M1}$ of roller M1 may be about 4 % faster than $V_s$ while the peripheral speed $S_{M2}$ of roller M2 may be about 4% slower than $V_s$. Also, the average peripheral speed of the two rollers M1 and M2 is about the same as the strand velocity $V_s$. Mathematically, the speed and velocity relationships may be stated as follows:

$$S_{M1} = V_s (1 + n) \quad \text{(equation 1)}$$

$$S_{M2} = V_s (1 - n) \quad \text{(equation 2)}$$

where $S_{M1}$ represents the peripheral speed of the roller M1; $S_{M2}$ represents the peripheral speed of the adjacent roller M2; $V_2$ represents the strand velocity; and, n represents a positive number (e.g., 0.04). Similarly, the otherpairs of adjacent rollers in the MIDDLE section of the conveyor 20 are operated in the same way, vis.: The roller M3 is given a peripheral speed $S_{M3}$ which is about 4% faster than the strand of velocity $V_s$; the roller M4 is given a peripheral speed $S_{M4}$ which is about 4% slower than the strand velocity $V_s$; the roller MN1 is given a peripheral speed $S_{MN1}$ which is about 4% faster than the strand velocity $V_s$; the roller MN2 is given a peripheral speed $S_{MN2}$ which is about 4% slower than the strand velocity $V_s$; the roller MN3 is given a peripheral speed $S_{MN3}$ which is about 4% faster than the strand velocity $V_s$; the roller MN4 is given a peripheral $S_{MN4}$ which is about 4% slower than the strand velocity $V_s$; the roller MP1 is given a peripheral speed $S_{MP1}$ which is about 4% faster than the strand velocity $V_s$; the roller MP2 is given a peripheral speed $S_{MP2}$ which is about 4% slower than the strand velocity $V_s$; etc. Moreover, the average peripheral speed of all the asynchronously rotated rollers M1 ... MP4 in the MIDDLE section is about the same as the strand velocity $V_s$. Although, the faster and slower rollers are illustrated as being 4% faster and 4% slower, it is to be understood that the figure 4% is given as one example and that the rollers may be driven with slip greater than or less than, 4%.

Also, the faster and slower peripheral speeds of the adjacent rollers M1 and M2 ... MP1 an MP2. .. are asynchronous relative to each other in each pair as well as to the strand velocity $V_s$. As shown in FIG. 7, the rollers M1, M3 ... MN1, MN3 ... MP1, which have peripheral speeds faster than the strand velocity $V_s$, exert frictional forces $f_{M1}, f_{M3} \ldots f_{MN1}, f_{MN3} \ldots f_{MP1}$, respectively, on the strand 24 in the same longitudinal direction as the strip is moving; e.g., in the direction of vector $V_s$. The aforementioned rollers having faster peripheral speeds (about 4% faster) than the strip velocity $V_s$ canbe considered to have a positive slip velocity, or slip, relative to $V_s$. Similarly, as shown in FIG. 7, the rollers M2, M4 ... MN2, MN4 ... MP2, which have slower peripheral speeds (about 4% slower) than the strand velocity, exert frictional forces $f_{M2}, f_{M4} \ldots f_{MN2}, f_{MN4} \ldots f_{MP2}$, respectively, on the strand 24 in the opposite longitudinal direction of the strand movement; i.e., in a longitudinal direction opposite that of the velocity vector $V_s$. The aforementioned rollers having the slower peripheral speeds (about 4% slower)than the strip velocity $V_s$ can be considered to have a negative slip velocity, or slip, relative to $V_s$. Consequently, the frictional forces exerted on the strand 24 by the moving peripheries of each pair of the adjacently located rollers cancel each other since such forces are of substantially equal magnitude and are oppositely directed. For example, for the pair of adjacent rollers M1 and M2, the frictional force $f_{M1}$ exerted on the strand 24 by the faster roller M1 is cancelled by the adjacently exerted frictional force $f_{M2}$ of the slower roller M2. As a result, the established tension $T$ in the strand 24 is not changed. Similarly, as indicated at FIG. 7, the frictional forces $f_{M3}$ and $f_{M4}$ cancel each other. Also, as shown, the paired frictional forces $f_{MN1}$ and $f_{MN2}$, $f_{MN3}$ and $f_{MN4}$ ... $f_{MP1}$ and $f_{MP2}$ also cancel each other as hereinbefore described.

The term positive slip velocity, or positive slip, employed herein means that the particular roller having a peripheral speed faster than $v_s$ slips forward of, or faster than, the strand 24. Likewise, the term negative slip velocity, or negative slip, means that the particular roller having a peripheral speed slower than $V_s$ slips behind, or slower than, the strand 24.

Thus, in accordance with the invention as exemplified in FIGS. 6 and 7, a thin longitudinal strand 24, or strip, supported on a series of rollers and moving under longitudinal tension $T$ at an established longitudinal velocity $V_s$ is continued in motion by independent rotation of pairs of adjacent rollers in the series contacting the moving strand 24 in such manner that, in each pair, one roller has a peripheral speed which is faster than the strand velocity $V_s$ and the other roller has a peripheral speed which is slower than $V_s$; the average peripheral speed of each pair of rollers being about the same as the strand velocity $V_s$ and each pair of rollers exerting substantially equal and opposite directed frictional forces on the strand and thereby cancelling each other whereby the established tension $T$ remains unchanged and the strand 24 continues to move at its established velocity $V_s$. Thus, the mathematical relationships hereinbefore set forth can be generalized as follows:

$$V_1 = V_s (1 + n) \qquad \text{(equation 3)}$$

$$V_2 = V_s (1 - n) \qquad \text{(equation 4)}$$

wherein $V_1$ represents the peripheral speed of one of the rollers in each pair of adjacent rollers; $V_2$ represents the peripheral speed of the other roller in each pair of adjacent rollers; $V_s$ represents the velocity of the strand; and, $n$ is a positive number.

A reference to FIG. 3 will give an indication of how the asynchronous rotation of the various pairs of rollers (M1 and M2 ... MP3 and MP4) in the MIDDLE section may be accomplished in a relatively easy way and with relatively uncomplicated means. For example, the drive motor 40 is directly coupled to the shaft 32 on which the sprocket wheel 42 and the roller MN1 are keyed, or otherwise secured, for rotation. The roller MN1 and the sprocket wheel 42 have the same angular velocity as the shaft 32. Also, the roller MN1 has a peripheral speed $S_{MN1}$ which, as stated hereinbefore, is about 4% faster than the velocity $V_s$ of strand 24. The sprocket wheel 46, driven by the chain 44 and the sprocket wheel 42, has a larger diameter and more teeth than the sprocket wheel 42 so that the angular velocity and peripheral speed of the roller MN2 is about 4 percent slower than the strand velocity $V_s$. The rest of the sprocket wheels associated with the rest of the roller pairs of the MIDDLE section of rollers are alternately sized in the same manner as the sprocket wheels 42 and 46. The foregoing relationships among angular velocity, peripheral speeds, diameter of sprocket wheels and diameter of rollers are well understood and widely known.

FIGS. 8 and 9 illustrate another way of accomplishing the same result as achieved by practicing the method shown in FIGS. 6 and 7; i.e., maintaining the established strand tension $T$ and velocity $V_s$ by asynchronously rotating the various rollers M1 ... MP4 of the MIDDLE section of rollers so that the frictional forces applied by the peripheries of the various rollers to the strand 24 cancel each other thereby leaving the established strip tension $T$ substantially unchanged. As illustrated, the various rollers are doubly paired. For example, the rollers M1 and M2 are both rotated clockwise, unidirectionally, so that they have peripheral speeds $S_{M1}$ and $S_{M2}$ which are faster (e.g., about 4 percent faster) than the strand velocity $V_s$. The rollers M1 and M2 produce frictional forces $f_{M1}$ and $f_{M2}$ in the strand 24 and these forces are oriented in the same direction and are additive, as indicated. Also, the adjacent pair of rollers M3 and M4 are both rotated clockwise, unidirectionally so that they have peripheral speeds $S_{M3}$ and $S_{M4}$ which are slower (e.g., about 4 percent slower) than the strand velocity $V_s$. The slower rotating rollers M3 and M4 produce the frictional forces $f_{M3}$ and $f_{M4}$ in the strand 24. While the frictional forces $f_{M3}$ and $f_{M4}$ are additive with respect to each other they are, however, oppositely directed with respect to the forces $f_{M1}$ and $f_{M2}$, as indicated in FIG. 9. Consequently, the additive forces $f_{M3}$ and $f_{M4}$ cancel the additive forces $f_{M1}$ and $f_{M2}$. As a result, the established tension $T$ in the moving strand 24 remains substantially unchanged. Moreover, the average peripheral speed of the four rollers M1, M2, M3 and M4 ($S_{M1}, S_{M2}, S_{M3}$ and $S_{M4}$) is the same as the velocity $V_s$ of the strand 24. Similarly, as shown in FIGS. 8 and 9, the relative peripheral speeds of the next four rollers M5, M6, M7 and M8 are such that the frictional forces $f_{M5}$ and $f_{M6}$ are canceled by the oppositely directed forces $f_{M7}$ and $f_{M8}$. Again, the result is that the tension $T$ in the strand 24 remains substantially unchanged. These relative peripheral speed and frictional force conditions obtain for every other group of four adjacent rollers M9 ... MP4 in the MIDDLE section of rollers. Also, the various sprocket wheels keyed to the shafts of the various rollers of the MIDDLE section rollers are appropriately sized to provide the peripheral speed relationships hereinbefore discussed. For example, the rollers M5 and M6 have equal peripheral speeds $S_{M5}$ and $S_{M6}$, respectively, which are about 4 percent faster than $V_s$. Therefore, the rollers M5 and M6 have sprocket wheels of equal diameter. Since the adjacent rollers M7 and M8, in the set of four rollers, rotate at peripheral speeds which are about 4 percent slower than strand velocity $V_s$ their sprocket wheels have a larger diameter.

Mathematically, the various speed relationships for a set of four rollers M1, M2, M3 and M4 may be set forth generally and specifically as follows:

$$V_1 = S_{M1} = V_s (1 + n) \quad \text{(equation 5)}$$

$$V_2 = S_{M2} = V_s (1 + n) \quad \text{(equation 6)}$$

$$V_3 = S_{M3} = V_s (1 - n) \quad \text{(equation 7)}$$

$$V_4 = S_{M4} = V_s (1 - n) \quad \text{(equation 8)}$$

wherein $V_1$, $V_2$, $V_3$ and $V_4$ represent the peripheral speeds of four of the rollers in the set; $S_{M1}$, $S_{M2}$, $S_{M3}$ and $S_{M4}$ represent the peripheral speeds of the rollers M1, M2, M3 and M4; $V_s$ represents the velocity of the strand; and, $n$ is a positive number.

Thus, in accordance with the invention as exemplified in FIGs. 8 and 9, a longitudinal thin strand 24, or strip, supported on a series of rollers and moving under longitudinal tension $T$ at an established velocity $V_s$ is continued in motion by the independent rotation of double pairs of adjacent situated rollers contacting the moving strand 24 in such manner that, in each set of four rollers, two of the rollers have peripheral speeds which are faster (i.e., about 4% faster) than the strand velocity $V_s$ while the other two rollers in the set have peripheral speeds which are slower (i.e., about 4% slower) than the velocity $V_s$ of the strand 24; the frictional forces applied to the strand by the four rollers cancelling each other such that the established tension $T$ remains substantially unchanged while the strand 24 continues to move at the velocity $V_s$.

FIGS. 10 and 11 illustrate another way of accomplishing the same result as is achieved by the two methods hereinbefore described; i.e., the method of FIGS. 6 and 7 and the method of FIGS. 8 and 9. As shown, in FIGS. 10 and 11 the rollers M1, M2 and M3 are all rotated clockwise so that they have the peripheral speeds $S_{M1}$, $S_{M2}$ and $S_{M3}$ which are all faster (e.g., about 4 % faster) than the strand velocity $V_s$. These three rollers M1, M2 and M3 produce the frictional forces $f_{M1}$, $f_{M2}$ and $f_{M3}$ on the strand 24, all of which are oriented in the same direction and are additive. In like manner, the rollers M4, M5 and M6 are all unidirectionally rotated clockwise at peripheral speeds $S_{M4}$, $S_{M5}$ and $S_{M6}$ which are slower (e.g., about 4% slower) than the strand velocity $V_s$. Similarly, these rollers produce the frictional forces $f_{M4}$, $f_{M5}$ and $f_{M6}$ in the strand 24 which are all oriented in the same direction and are additive. However, the combined, or additive, frictional forces $f_{M4}$, $f_{M5}$ and $f_{M6}$ are equal and oppositely directed with respect to the combined, or additive, forces $f_{M1}$, $f_{M2}$ and $f_{M3}$. As a result, the frictional forces produced by the faster and slower rotating rollers M1 . . . .M6 cancel each other so that the established tension $T$ is strand 24 remains substantially unchanged. Moreover, the average peripheral speed of the six rollers M1 . . . M6 ($S_{M1}$ . . . $S_{M6}$) is the same as the strand velocity $V_s$. As suggested in FIGS. 10 and 11 the three rollers M7, M8 and M9 develop frictional forces $f_{M7}$, $f_{M8}$ and $f_{M9}$ in the strand 24 which are opposed and canceled by three rollers M10, M11 and M12 (not shown in FIGS. 10 and 11). In accordance with the discussion hereinbefore appearing the faster rotating rollers such as M1, M2, and M3 have the same size sprocket wheels while the slower rotating rollers M4, M5 and M6 have the larger diameter sprocket wheels. Mathematically, for FIGS. 10 and 11, the various peripheral speed relationships can be expressed as follows:

$$V_1 = S_{M1} = V_s (1 + n) \quad \text{(equation 9)}$$

$$V_2 = S_{M2} = V_s (1 + n) \quad \text{(equation 10)}$$

$$V_3 = S_{M3} = V_s (1 + n) \quad \text{(equation 11)}$$

$$V_4 = S_{M4} = V_s (1 - n) \quad \text{(equation 12)}$$

$$V_5 = S_{M5} = V_s (1 - n) \quad \text{(equation 13)}$$

$$V_6 = S_{M6} = V_s (1 - n) \quad \text{(equation 14)}$$

wherein $V_1$, $V_2$, $V_3$, $V_4$, $V_5$ and $V_6$ represent the peripheral speeds of the individual rollers in the set of six rollers involved; $S_{M1}$, $S_{M2}$, $S_{M3}$, $S_{M4}$, $S_{M5}$ and $S_{M6}$ represent the peripheral speeds of the six rollers identified in FIGS. 10 and 11; $V_s$ represents the velocity of the strand 24; and, n represents a positive number.

Thus, in accordance with the invention exemplified in FIGS. 10 and 11, the longitudinal thin steel strand 24, or strip, supported on the series of rollers and moving under longitudinal tension $T$ at an established longitudinal velocity $V_s$ is continued in motion by the independent rotation of a set of six rollers contacting the moving strip 24 in such manner that, in each set of six rollers, three of the rollers have peripheral speeds which are faster than the strip velocity $V_s$ and the other three rollers have peripheral speeds which are slower than the strip velocity $V_s$; the average peripheral speed of the set of six rollers being substantially the same as the strand velocity $V_s$ and the frictional forces exerted on strand 24 by the first mentioned set of three rollers cancelling the frictional forces exerted on the strand 24 by the latter three rollers whereby the strand tension $T$ remains substantially unchanged while strand 24 moves at the velocity $V_s$.

The extension to larger groups than six is apparent.

FIGS. 12 and 13 are diagrammatic illustrations of a pair of "fast" and "slow" rollers MN1 and MN2, respectively. These figures also contain tabulations showing relative percent slip between strand velocity and the peripheral speeds of the rollers MN1 and MN2 for various changes, $M$, in the speed of the D.C. drive motor 40 which drives all of the rollers in the group of which the rollers MN1 and MN2 are a part. While the illustrations and tabulations of FIGS. 12 and 13 are particularly directed to the asynchronous operation of pairs of adjacent rollers MN1 and MN2 as shown in FIGS. 6 and 7, hereinbefore discussed, it is to be understood that the discussion with respect to relative changes in peripheral speeds of the rollers in response to changes in drive motor speed also applies to the alternative forms and practices of the invention as disclosed in FIGS. 8, 9, 10 and 11. The illustrations and tabulations shown in FIGS. 12 and 13 are employed for the purpose of emphasizing an important aspect of the invention; namely, that the speeds of the D.C. drive motors which rotate groups of the asynchronously driven rollers can vary within certain limits, hereinafter described, and such speed variations will not cause significant changes in the strip tension $T$. Moreover, with the asynchronous rotation of the rollers according to the invention, as described hereinbefore with reference to the FIGS. 6 through 11, the speeds of the drive motors can vary widely; i.e., widely as compared with the relatively close tolerance (few hundredths of a percent) which, as stated hereinbefore, would be the case if an attempt were made to rotate all of the rollers at the same peripheral speed as the strand velocity $V_s$. FIG. 12 diagrammatically shows the pair of adjacent rollers MN1 and MN2 and the faster rotating roller MN1 has the peripheral speed $S_{MN1}$ while the slower rotating roller MN2 has the peripheral speed $S_{MN2}$. As indicated in the FIG. 12 tabulation the peripheral speeds $S_{MN1}$ and $S_{MN2}$ are mathematically stated in terms of $V_s$, $m$ and $n$ by equations similar to equations 1 and 2, hereinbefore set forth as $S_{MN1} = V_s (1 + m + n)$, $S_{MN2} = V_s (1 + m - n)$. In the example chosen for FIG. 12, $n$ is equal to 0.04 or 4% and $m$ is successively equal to 0.01, 0.02, 0.03, 0.04, 0.05, 0.06 or 1%, 2%, 3%, 4%, 5%, 6%, respectively. The drive motor 40 (Fig. 3) drives the roller MN1 and the chain 44; the sprockets 42 and 46 drive the slower rotated roller MN2. Normally, the rotational speed of the drive motor 40 is set such that the roller MN1 has a peripheral speed, $S_{MN1}$ which is about 4% faster than the strip velocity $V_s$. The chain and sprocket drive arrangement drives the adjacent roller MN2 such that it has a peripheral speed $S_{MN2}$ which is about 4% slower than $V_s$. For the stated conditions the tabulation in FIG. 12 indicates the percent speed changes which $S_{MN1}$ and $S_{MN2}$ would undergo for incremental increases, $m$, of 1% in the speed of the drive motor 40. For example $S_{MN1}$ and $S_{MN2}$ are 4% faster and slower (+4% and −4%), respectively, than $V_s$ when the drive motor 40 is at its "normal" speed. An increase of 1% in the speed of the drive motor 40 will result in $S_{MN1}$ increasing to 5% faster (+5%) than $V_s$ while $S_{MN2}$ increases to 3% slower (−3%)than $V_s$. If the speed of drive motor 40 increases by an increment of 1% (+1%) to 2% faster than $V_s$ nominal then $S_{MN1}$ will increase to a speed 6% faster (+6%) than $V_s$ while $S_{MN2}$ will increase to a speed 2% slower (−2%) than $v_s$. The tabulation in FIG. 12 indicates the percent increase of the peripheral speeds $S_{MN1}$ and $S_{MN2}$ for further 1% increases in the speed of motor 40. For example, percent increases of 3%, 4%, 5% and 6% in motor speed are shown as well as the corresponding increases in the speeds $S_{MN1}$ and $S_{MN2}$. It is to be noted that a 3% overall increase (+3%) in the speed of motor 40 results in an increase in the peripheral speed of $S_{MN1}$ to 7% faster (+7%) than $V_s$ and also an increase in the speed $S_{MN2}$ to 1% slower (−1%) than $V_s$. At this point the roller MN1 is slipping 7% faster (forward) than the strand 24 while the roller MN2 is only slipping 1% slower (behind) the strand. Therefore, even with a 3% increase (+3%) in the speed of motor 40 the one roller MN1 is still exerting a frictional force $f_{MN1}$ which is oppositely directed with respect to the frictional force $f_{MN2}$ developed by the roller MN2. As stated hereinbefore the frictional forces developed between the rollers and the strand 24 do not change magnitude very much as the magnitude of the slip velocity or slip changes. Thus, even for a 3% increase (+3%) in the speed of motor 40, the oppositely directed frictional forces $f_{MN1}$ and $f_{MN2}$ are still substantially equal with the result that the tension $T$ in the strand 24, as it passes over the rollers MN1 and MN2, is not significantly changed. The tabulation in FIG. 12 also shows further increases of 4, 5 and 6% in the speed of motor 40. Note that at a 4% increase (+4%) the speed $S_{MN1}$ indicates a slip of +8% with respect to $V_s$ while the speed $S_{MN2}$ has no slip with respect to the strand velocity $V_s$. Thus, the roller MN2 has a peripheral speed $S_{MN2}$ which is the same as, or in synchronism with the strand velocity $V_s$. Therefore, for the pair of rollers MN1 and MN2 the frictional force $f_{MN1}$ is not balanced, or canceled. Furthermore, as the speed of the motor 40 increases by 5% (+5%) the tabulation indicates that the roller MN1 slips forward 9% faster (+9%) than the speed of the strand 24 while the adjacent roller MN2 slips forward, or faster than, the speed of the strand by 1% (+1%). In this case both $f_{MN1}$ and $f_{MN2}$ pull forward. Similarly, for a 6% increase in the speed of motor 40 the two rollers MN1 and MN2 have slip speeds which are 10% and 2%, respectively, faster (+10% and +2%) than the strand velocity $V_s$. Again both $f_{MN1}$ and $f_{MN2}$ pull forward. The important point, considering the example chosen, is that the speed of the motor 40 can increase by 3% and the rollers MN1 and MN2 will still exert, at slips of +7% and −1%, substantially equal and opposite frictional forces $f_{MN1}$ and $f_{MN2}$ which cancel each other thereby leaving the tension $T$ substantially unchanged.

The tabulation in FIG. 13 shows what happens to the peripheral speeds of the rollers MN1 and MN2 as the speed of the motor 40 is decreased in increments, $m$, of 1% (−1%). Initially, the peripheral speeds $S_{MN1}$ and $S_{MN2}$ are at faster and slower (+4% and −4%), respectively, than $V_s$ when the motor 40 is at its "normal" speed. However, should the speed of the motor 40 decrease by 1% (−1%) the peripheral speed $S_{MN1}$ of the roller MN1 will decrease such that it only runs 3% faster (+3%) than $V_s$ while the peripheral speed $S_{MN2}$ of the adjacent roller MN2 decreases further until it runs at a speed 5% slower (−5%) than $V_s$. As shown in the tabulation in FIG. 13, further incremental decreases of 1% (−1%) in the speed of the drive motor 40 change the relative slip speeds between the rollers MN1 and MN2 and the strand 24. For example, when the speed of the motor 40 decreases by 3% (−3%) the peripheral speed $S_{MN1}$ of the roller MN1 is still 1% faster (+1%) than $V_s$ while the peripheral speed $S_{MN2}$ of the roller MN2 is 7% slower (−7%) than $V_s$. However, as stated hereinbefore, when the speeds of the rollers are asynchronous with respect to the velocity $V_s$ of the strand 24 the magnitudes of the frictional forces developed between the asynchronously rotated rollers and the strand are relatively independent of the magnitudes of the slip velocities. Thus, the frictional forces $f_{MN1}$ and $f_{MN2}$ are substantially equal and opposite thereby cancelling each other even though the speed of the motor 40 is decreased by 3%. As a result, the tension $T$ in the strand 24 remains unchanged. A further 1% decrease (−1%) in the speed of motor 40 to an overall decrease of 4% (−4%) results in the roller MN1 having a peripheral speed which is in synchronism with the speed $V_s$ of the strand 24. However, the slower rotating roller MN2 slips even further behind, or slower than strand velocity $V_s$ until it has a peripheral speed $S_{MN2}$ which is 8% slower (−8%) than $V_s$. At this point the frictional force $f_{MN2}$ developed by the roller MN2 which is slipping 8% behind the strand velocity $V_s$ is not balanced, or cancelled, by the frictional force developed by the other roller MN1 which is rotating in synchronism with strand velocity. Further decreases of 1% in the speed of motor 40 are illustrated and they indicate that the frictional forces developed by the two rollers are in the same direction and are not cancelling each other. However, for the specific example shown the speed of the motor 40 may decrease by as much as 3% while the two rollers MN1 and MN2 still develop oppositely directed frictional forces $f_{MN1}$ and $f_{MN2}$ which cancel each other so that when the strand 24 having a velocity $V_s$ passes over the pair of rollers MN1 and MN2 no change in tension $T$ occurs.

Thus, the diagram and tabulations of FIGS. 12 and 13 indicate that at normal speed of the motor 40 the adjacent rollers MN1 and MN2 have peripheral speeds which are 4% faster (+4%) and 4% slower (−4%), respectively, than the velocity $V_s$ of strand 24. However, the speed of the motor 40 may increase or decrease by at least 3% and the changed peripheral speeds of the adjacent rollers MN1 and MN2 will still function effectively to provide frictional forces which are substantially equal and opposite thereby leaving the established tension $T$ in the strand 24 unchanged.

In the particular example illustrated at FIGS. 6, 7, 12 and 13 $n$ was chosen to be 0.04 or 4%. It is to be understood that 4% has been chosen for purposes of illustrating the invention. $n$ may be larger than 0.04 or smaller than 0.04. For example, in the tabulation shown in FIGS. 12 and 13 if, at normal drive motor speed, $n$ is chosen as 0.06 (6%), wider variations in the speed of motor 40 may be tolerated. For example, the speed of the motor 40 may increase or decrease by 5% without changing the tension $T$ in the strand 24 if the rollers MN1 and MN2 are initially rotated so that the faster roller MN1 has a peripheral speed which is 6% faster (+6%) than $V_s$ and the slower roller MN2 has a peripheral speed which is 6% slower (−6%) than $V_s$.

For the alternative embodiments and practices of the invention shown in FIGS. 8, 9, 10 and 11, tabulations similar to those of FIGS. 12 and 13 may be developed to show that similar variations in drive motor speed can be tolerated without significantly affecting changes in the tension $T$ of the strand 24.

Another embodiment of the invention is illustrated at FIGS. 14, 15 and 16 whereat tapered rollers (e.g., frustro-conical rollers) are employed. As shown, some rollers of the BEGINNING AND MIDDLE sections of a roller-type conveyor 20A are illustrated. Conveyor 20A of FIGS. 14 and 15 is similar to the conveyor 20 shown in FIGS. 1, 2 and 3, except for the use of frustro-conical rollers. The advantages of employing frustro-conical rollers are set forth hereinafter. In FIGS. 14 and 15 some rollers, BA13 ... BAN, of the BEGINNING section are shown and some rollers, MA1 ... MA4, of the MIDDLE section are shown. As is illustrated each of the aforementioned rollers has a larger diameter at one end thereof than at the other. For example, the rollers BA13 ... MA4 are intended to be rotated by separate drive motors and chain-and-sprocket drive arrangements so that their mode of operation is similar to that of the rollers of FIGS. 6 and 7, hereinbefore discussed. That is, the roller BA13 has an average peripheral speed which is $n$ (e.g., 4%) faster (+4%) and the adjacent roller BA14 has an average peripheral speed which is n (e.g., 4%) slower (−4%) than the average of their two speeds. For the frustro-conical rollers shown the average peripheral speed is the peripheral speed of the particular roller at its mid-point, halfway between the larger and smaller diameter ends thereof. Similarly, the rollers BA15 and BA16 have average peripheral speeds which are $n$ faster and $n$ slower respectively, than the average of their two speeds. This alternating arrangement of one roller going faster than average and the adjacent roller slipping going slower than average is carried on throughout all of the rollers of the BEGINNING section, through to the final roller BAN of the BEGINNING section. In like manner, all of the rollers of the MIDDLE section have similar speed differences between adjacent rollers. They are alternately rotated so that one slips forward, or faster, than the moving strand 24 and the adjacent roller slips behind, or slower, than the moving strand. For example, in the MIDDLE section the roller MA1 has an average peripheral speed of n (e.g., 4%) faster (+4%) than $V_s$ while the adjacent roller MA2 has an average peripheral speed which is n (e.g., 4%) slower (−4%) than $V_s$. In like manner, the adjacent rollers MA3 and MA4 have average peripheral speeds which are n faster and slower, respectively, than the speed $V_s$ of the strand 24. Because of the frustro-conical shape of the rollers the peripheral speed will be different at different locations on the roller surface. For example, for the adjacent "fast" and "slow" rollers BA13 and BA14 the relative peripheral speeds $S_{BA13}$ and $S_{BA14}$ are shown at three different locations on each of the rollers. The roller BA13 has a peripheral speed $S_{BA13}$ 4% faster (+4%) compared to the average speeds of BA13 and BA14. Also, the same roller BA13 has a peripheral speed $S_{BA13}$ 5% faster (+5%) than the average speeds of BA13 and BA14 at an extremity thereof near its larger diameter end, which is also located at an extremity of the strand width dimension. Also, the same roller BA13 has a peripheral speed $S_{BA13}$ 3% faster (+3%) than the average speeds of BA13 and BA14 at an extremity near its smaller diameter end, which is also at an extremity of the width dimension of the strand 24. Similarly, the roller BA14 has a peripheral speed $S_{BA14}$ 4% slower (−4%) than the average speeds of BA13 and BA14 at its center, which is also at the centerline of the strand 24. Also, the same roller BA14 has a peripheral speed $S_{BA14}$ 5% slower (−5%) than the average speeds of BA13 and BA14 at an extremity thereof near its smaller diameter end. Also, the same roller BA14 has a peripheral speed $S_{BA14}$ 3% slower (−3%) than the average speeds of BA13 and BA14 at an opposite extremity near its larger diameter end, which end is also near the extremity of the width dimension of the strand 24. As may be appreciated by inspecting on FIG. 15 the adjacent rollers BA13 and BA14 at the three points of interest involved, the underside of the strand 24 is successively contacted by peripheries having peripheral speeds of 5% faster (+5%) and 5% slower (−5%) than average at the one width extremity of the strand. At the other width extremity of the strand peripheral speeds of the two rollers are 3% faster (+3%) and 3% slower (−3%) than average. At the center of the strand 24, the peripheral speeds of the rollers are 4% faster (+4%) and 4% slower (−4%) than average. The frictional forces developed by rotating rollers, when they are not in synchronism with the speed $V_s$ of the strand 24, are relatively insensitive to, or independent of, the slip speed of the surfaces of the rollers. Thus the magnitude of the frictional forces developed in the strand 24 change only negligibly in relation to slip speed magnitudes so that the frictional forces developed by the roller BA13 on the strand 24 may or may not cancel the oppositely directed frictional forces developed in the strand 24 by the slower rotating roller BA14 depending on the strand speed. The same is true for the other pairs of rollers shown. In other words, the frictional forces developed by the rollers BA15 and BA16 may or may not cancel each other depending on strand speed, etc.

The MIDDLE section of rollers, MA1 ... MAN, are paired such that in each pair one of the rollers such as MA1 has an average peripheral speed which is $n$ (e.g., 4%) faster (+4%) than $V_s$ while the other rollers such as MA2 has an average peripheral speed which is $n$ (e.g., 4%) slower (−4%) than $V_s$. For the "faster" roller MA1 having an average peripheral speed of n faster (e.g., 4% faster) than $V_s$ the peripheral speed at the larger and smaller cross sections, under the strand width extremities, will be +5% and +3%. At the adjacent "slow" roller MA2, which has an average peripheral speed $n$ slower (i.e., 4% slower than $V_s$), the width extremities will be at peripheral speeds wich are −5% and −3%. FIG. 15 illustrates a particular example wherein the "faster" roller MA1 has an average peripheral speed $S_{MA1}$ which is 4% faster (+4%) than $V_s$. The peripheral speed vector $S_{MA1}$ at the middle of the tapered roller MA1 bears the label +4%, meaning that the peripheral speed $S_{MA1}$ of roller MA1, at that point is 4% faster than $V_s$. The peripheral speed $S_{MA1}$ at the edge of the strand 24 toward the larger diameter dimension of the roller is labeled as +5%, meaning that the peripheral speed $S_{MA1}$ at that point is 5% faster than $V_s$. Similarly, the peripheral speed $S_{MA1}$ at the other edge of the strand 24 toward the smaller diameter dimension of the roller is labeled as +3%, meaning that the peripheral speed $S_{MA1}$ at that point is 3% faster than $V_s$. The peripheral speed vector $S_{MA2}$ at the middle of the tapered roller MA2 bears the label −4%, meaning that the peripheral speed $S_{MA2}$ of the roller MA2 at that point is 4% slower than $V_s$. The peripheral speed $S_{MA2}$ at the edge of the strand 24 toward the larger diameter dimension of the roller is labeled as −3%, meaning that the peripheral speed $S_{MA2}$ at that point is 3% slower than $V_s$. Similarly, the peripheral speed $S_{MA2}$ at the other edge of the strand 24 toward the smaller diameter dimension of the roller MA2 is labeled as −5%, meaning that the peripheral speed $S_{MA2}$ at that point is 5% slower than $V_s$. Thus, the strand 24 along its longitudinal center line moves with velocity $V_s$ over the roller MA1 which at that point is slipping 4% forward of, or faster than, $V_s$. Immediately adjacent, at the center of the roller MA2, the longitudinal centerline of the strand 24 moves over the roller MA2, which at that point is slipping 4% behind, or slower than, $V_s$. However, the frictional forces $f_{MA1}$ and $f_{MA2}$ are, as indicated in FIG. 15, oppositely directed and are of equal magnitude so that at the center line of the strand 24 these frictional forces cancel each other. Also, in FIG. 15 on the roller MA1 the peripheral speed vectors $S_{MA1}$ bearing the references +5% and +3%, near opposite edges of the strand 24 and at the larger and smaller diameter sections of the roller, indicate that the peripheral speeds $S_{MA1}$ are 5% and 3% faster than $V_s$. Thus, the longitudinal section of the strand 24 which spans the two adjacent rollers MA1 and MA2 experiences at one of its edges a transitional slipping with respect to the two rollers of from +5% to −5%; the opposite edge experiences a transitional slipping with respect to the two rollers of +3% and −3%; and, the centerline of the strand 24 experiences a transitional slipping with respect to the two rollers of +4% to −4%. The same holds true for every pair of adjacently-located tapered rollers in the conveyor 20A. Moreover, the developed frictional forces between the rotating rollers and the moving strip 24 when their peripheral velocities are not in synchronism with the strand velocity $V_s$, is approximately the same as the weight of the strand supported by each roller and is relatively insensitive to, or independent of, slip velocity. The frictional force on the strand is the same at all points of contact between the peripheries of the tapered rollers and the strand. For example, the frictional force exerted on the strand 24 is nearly the same at all points of the peripheries of the rollers MA1 whereat the slip speeds are indicated as +5%, +4% and +3%. Frictional forces of nearly equal magnitude, but oppositely directed, are developed at corresponding points on the adjacent roller MA2. No substantial change in strand tension $T$ occurs.

FIGS. 17–29 are diagrammatic illustrations of the pair of tapered frustro-conical rollers MA1 and MA2. These figures show the relative percent slip between the peripheral speeds $S_{MA1}$ and $S_{MA2}$ and the strip velocity at three different points on the peripheries of the tapered rollers, as the speed of the D.C. motor driving the particular roller group, of which said rollers are a part, varies in increments m of 1%. The diagrammatic illustrations shown in FIGS. 17–29 are included for the purpose of emphasizing another important aspect of the invention; namely, that the speeds of the D.C. drive motors which rotate groups of the asynchronously driven tapered rollers can vary within certain limits, hereinafter described, and such speed variations will not cause significant changes in the strip, or strand, tension $T$. Also, with the asynchronous rotation of the tapered rollers according to the invention, as described hereinbefore with reference to FIGS. 14 and 15, the speeds of the drive motors can vary considerably; i.e., considerably as compared with the few hundredths of a percent tolerance which, as stated hereinbefore, would be the case if an attempt were made to rotate all rollers so that they have the same average peripheral speed as the strand velocity $V_s$. FIGS. 17–29 are also included for the purpose of showing that drive motor speeds from roller group to roller group can vary considerably and that tension T will not be affected significantly thereby.

In FIGS. 17–29 the individual rollers of each pair of rollers, MA1 and MA2, are labeled at three locations to indicate the percent of slip velocity in relation to the strand velocity $V_s$. For example, in FIG. 17 the roller MA1 is labeled +5%, +4% and +3% at a large diameter section, a middle section and a small diameter section, respectively. The reference +5% means that at that point on the periphery of the roller MA1 the peripheral speed $S_{MA1}$ is 5% faster than $V_s$; i.e., the slip, or slip velocity, is +5%. Similarly, the reference +4% means that at the middle of the periphery of the roller MA1 the peripheral speed $S_{MA1}$ is 4% faster than $V_s$; i.e., the slip, or slip velocity, is +4%. Likewise, the reference +3% means that at that point on the periphery of the roller MA1 the peripheral speed $S_{MA1}$ is 3% faster than $V_s$; i.e., the slip, or slip velocity, is +3%. The adjacent roller MA2 also bears similar slip, or slip velocity, information. For example, the reference −5% means that at that point on the periphery of the roller MA2 the peripheral speed $S_{MA2}$ is 5% slower than $V_s$; i.e., the slip, or slip velocity, is −5%. Likewise, the periphery of the roller MA2 bears appropriate indications that the slip is −4% at its mid-point and −3% toward the larger diameter end thereof. FIG. 17 shows the relative slip velocities of the tapered rollers MA1 and MA2 when the D.C. motor driving the roller group including the pair of rollers MA1 and MA2 is rotating at its normal speed; i.e., the average peripheral speeds $S_{MA1}$ and $S_{MA2}$ of the roller pair are at 4% faster (+4% slip) and 4% slower (−4% slip) respectively. If the normal speed of the drive motor is increased by 1% the result is illustrated at FIG. 18. As illustrated, the roller MA1 now has slips, or slip velocities, of +6%, +5% and +4%; corresponding peripheral sections of the adjacent roller MA2 have slips, or slip velocities of −4%, −3% and −2%. Even though the + and − slip velocities at corresponding peripheral sections on the two rollers have different absolute magnitudes the frctional forces developed are oppositely directed and have substantially the same absolute magnitudes. Thus, where the strand 24 moving at velocity $V_s$ travels from the roller MA1 to roller MA2 the same edge portion of the strand is subjected to +6% slip by one of the rollers and −4% slip by the other roller. However, at that same edge, the frictional forces developed are substantially equal and oppositely directed notwithstanding the different magnitudes of slip velocity. The same is true for the same pair of rollers where the centerline of the strand 24 passes from a periphery of +5% slip to the other roller where the slip is −3%. Likewise, the same condition prevails where the opposite edge of the strand 24 passes from one roller periphery having +4% slip to the other roller which has −2% slip.

FIG. 19 shows the relative slip velocities of the two tapered rollers MA1 and MA2 when the D.C. motor driving the roller group is rotated 2% faster than normal speed. The one roller MA1 has slip velocities of +7%, +6% and +5%. Correspondingly aligned peripheral sections on roller MA2 have slip speeds of −3%, −2% and −1%. Nevertheless, the developed frictional forces are of substantially equal magnitudes and are oppositely directed with the result that there is no significant change in the tension $T$ in the moving strand 24. In FIG. 20, a 3% increase in the speed of the drive motor results in the roller MA1 having the slip speeds of +8%, +7% and +6%. Correspondingly aligned peripheral sections of the roller MA2 have slip speeds of −2%, −1% and 0%. In this case 0% slip speed means that the peripheral section of the roller MA2 has the same peripheral speed as the speed of the strand, $V_s$, i.e., the roller MA2 and the moving strand 24 are in synchronous movement at that location. The other peripheral sections at −2% and −1% slip on the roller MA2 exert frictional forces which are equal in magnitude and oppositely directed to the frictional forces developed by the roller MA1 where its slip speed is +8% and +7%. Therefore, at an increase in drive motor speed of just under 3% oppositely directed frictional forces of substantially equal magnitude are exerted by the pairs of rollers. Hence, it is safe for the drive motor to increase its speed by almost 3% from its normal operating speed without causing tension changes in the strand.

Similarly, the FIGS. 24, 25 and 26 show the relative slip velocities on each of the rollers MA1 and MA2 for conditions where the drive motor decreases its speed in increments of 1%. For example, FIG. 24 shows the slip speeds where there has been a 1% decrease from normal speed in the speed of the drive motor; FIG. 25 shows the slip speeds where there has been a 2% decrease in drive motor speed; and, FIG. 26 shows the slip speeds where there has been a 3% decrease in drive motor speed. FIGS. 24 and 25 show the pair of rollers MA1 and MA2 as having + and − slip velocities. Hence, their frictional forces are of equal magnitude and oppositely directed. FIG. 26 indicates that the roller MA1 has a peripheral section at the small diameter end with 0 slip speed; i.e., the roller MA1 at that point is rotating is synchronism with the strand 24. Hence, the drive motor can have its speed decreased from normal by just under 3% and the pair of rollers MA1 and MA2 will still develop substantially equal and oppositely directed frictional forces with the result that the tension $T$ in the strand 24 remains unchanged.

FIGS. 21, 22 and 23 illustrate the various slip velocities which occur in the rollers when the speed of the drive motor is increased by 4%, 5% and 6% from normal. Likewise, the FIGS. 27, 28 and 29 show the various slip speeds which are developed when the drive motor has its normal speed decreased by 4%, 5% and 6%. Although as shown in FIG. 17 the drive motor speed is considered to be at its normal speed when the rollers MA1 and MA2 have relative average peripheral speeds which are 4% faster (+4% slip) and 4% slower (−4% slip) than the strand velocity $V_s$, it is to be understood that this has been done for the purpose of providing a specific example. The relative average peripheral speeds of rollers MA1 and MA2 could have been chosen, for example, such that the rollers MA1 and MA2 would have had normal peripheral speeds (average peripheral speeds) at their mid-sections of 6% faster (+6% slip) and 6% slower (−6% slip). In this case, drive motor speed could be varied even more widely from normal without changing the strip tension T.

FIGS. 17–29, taken in conjunction with FIGS. 14 and 15, also serve to illustrate another aspect of the invention; i.e., an aspect relating to gradual establishment of the change in strip tension T in the moving strand 24. As suggested in FIGS. 14 and 15 a number of the rollers ( . . . BA13, BA14, BA15, BA16 . . . BAN) in the BEGINNING section of the conveyor 20A are tapered; i.e., they have frustro-conical geometric shapes. These rollers may be driven by variable speed D.C. drive motors. By chaging the speed of the variable speed drive motor and the associated chain and sprocket drive mechanisms one can gradually increase or decrease the frictional drag on the strand 24. Taking the pair of tapered rollers BA13 and BA14 in FIG. 14 as an example, these rollers may have the same slip speeds as the rollers MA1 and MA2, respectively, shown in FIG. 17; i.e., the roller BA13 having the slip speeds of +5%, +4% and +3% while BA14 has the corresponding slip speeds of −5%, −4% and −3%. In such case, the variable speed drive motor is considered to be operating at a speed such that the average peripheral speed of its rollers is the same as the strand velocity, $V_s$. In other words, the average slip speed at all correspondingly aligned peripheral sections for both the rollers BA13 and BA14 is zero. In the event that the tension $T$ is to be increased on the strand 24 the speed of the variable speed drive motor may be decreased; said drive motor effectively lowering the speed of all of the rollers in a group of the BEGINNING section of the conveyor 20A. For example, for a 1% decrease in the speed of the drive motor every pair of rollers, including the rollers BA13 and BA14, will then have the slip speeds indicated in FIG. 24; the roller BA13 having the speeds shown in said figure for the roller MA1 while the adjacent roller BA14 has the slip speeds indicated for the roller MA2. As indicated, the roller BA13 will have the slip speeds +4%, +3% and +2% whereas the adjacent roller BA14 will have the corresponding slip speeds of −6%, −5% and −4%. Thus the pair of rollers cause no tension change. FIG. 25 shows what would happen if the speed of the D.C. drive motor were decreased by 2%. Similarly, FIG. 26 shows results for a 3% decrease in the drive motor speed. In each of these cases there is no net tension change due to the pair of rollers. In going from FIG. 26 to FIG. 28 speed conditions, however, the net change in tension goes from zero to maximum drag. In FIG. 29 (and beyond) the maximum drag continues. Thus, the frictional drag can be changed gradually by varying the speed of the D.C. drive motor controlling the rollers in the BEGINNING section of the conveyor 20A from the condition in FIG. 26 to that in FIG. 28.

In FIG. 30 another feature of the invention is set forth; i.e., a method and means for operating the conveyor 20, or 20A, so as to prevent, among other things, tearing or cobbling of the strand 24 in the event that one or more groups of rollers are stalled by, perhaps, drive motor failure. In addition, FIGS. 31 and 32 are enlarged illustrations showing some of the rollers in two different roller groups controlled by two different drive motors near the END section of the conveyor 20.

In FIG. 30 part of the MIDDLE section and part of the END section of conveyor 20 are diagrammatically illustrated. As shown, at the very end of the MIDDLE section there are two roller groups, each having 32 rollers. Each of these roller groups is powered by a separate drive motor, such as, the drive motors 40 and 41. In the partial END section shown there are two roller groups. One roller group is comprised of the 12 rollers beginning with the rollers E1 and E2. The motor 42 drives this group of 12 rollers. In addition, there is a final group of 60 rollers in the END section which are powered by the drive motor 43. At the end of the MIDDLE section shown, the drive motor 40 drives the 32 rollers MN1 ... MN32. A chain-and-sprocket drive mechanism 70 comprising a series of chain-and-drive sprockets is effective to rotate the rollers MN1 ... MN32 such that for each pair of rollers in this group, one roller has a peripheral speed which is faster than the strip velocity $V_s$ and the adjacent roller has a peripheral speed which is slower than the strip veocity. Similarly, the drive motor 41 has another chain-and-drive mechanism 72 which rotates the rollers MPA ... MP4. The rollers MPA ... MP4 are also rotated such that for each pair of adjacent rollers one roller is rotated such that it has a peripheral speed which is faster than strand velocity $V_s$ while the other roller has a peripheral speed which is slower than strand velocity. The drive motors 42 and 43 which operate two groups of rollers in the END section rotate the rollers E1 ... EN2 so that their peripheral speed sets, or establishes, the velocity $V_s$ of the strand 24. The roller groups in the MIDDLE section other than the two roller groups controlled by the motors 40 and 41 are rotated such that for each pair of rollers, one roller has a peripheral speed which is 4% faster (+4%) than strand velocity $V_s$ while the other adjacent roller in the same pair has a peripheral speed which is 4% slower (−4%) than the strand velocity $V_s$.

FIGS. 31 and 32, which show the rollers MN29 through MPD, illustrate the manner of controlling the speed of the rollers in the last two roller groups of the MIDDLE section, i.e., those roller groups driven by the motors 40 and 41. Assuming that except for the two roller groups driven by the motors 40 and 41, the rollers in all other roller groups in the MIDDLE section are driven in pairs such that in each pair one roller has a peripheral speed 4% faster than $V_s$ and the other roller has a peripheral speed 4% slower then $V_s$. The rollers in the roller groups controlled by the motors 40 and 41 are driven as indicated in FIGS. 31 and 32. Pairs of rollers in the group controlled, or driven, by the motor 40 are driven such that one roller is rotated such that it has a peripheral speed which is 5% faster (+5%) than $V_s$ while the other roller in the pair is rotated such that it has a preiphaeral speed which is 3% slower (−3%) than $V_s$. For example, FIGS. 31 and 32 show that the rollers MN29 and MN30 have peripheral speeds which are 5% faster and 3% slower, respectively, than $V_s$. A similar condition of the next roller group, however, in this roller group, controlled by the motor 41, the rollers are rotated in pairs such that for each pair one roller has a peripheral speed 6% faster than $V_s$ while the other roller has a peripheral speed which is 2% slower than $V_s$. Thus, as shown in FIGS. 31 and 32 roller MPA has a peripheral speed 6% faster (+6%) than $V_s$ while the adjacent roller MPB has a peripheral speed which is 2% slower (−2%) than $V_s$. Similarly, the next pair of rollers MPC and MPD have peripheral speeds 6% faster and 2% slower, respectively, than $V_s$.

The average speed of the roller pairs in the roller group driven by motor 40 is $m$ faster (+1%) than $V_s$. The average peripheral speed of each pair of rollers in the roller group driven by the drive motor 41 is $m$ faster (+2%) than $V_s$.

Expressed mathematically the peripheral speed $S_{MN29} = V_s(1 + m + n) = V_s(1 + 0.01 + 0.04) = V_s(1 + 0.05)$. The peripheral speed of $S_{MN31}$ is the same as that given for the roller MN29. The peripheral speed $S_{MN30}$ of the roller MN30 is $S_{MN30} = V_s(1 + m - n) = V_s(1 + 0.01 - 0.04 = V_s(10 - 0.03)$. The peripheral speed $S_{MN32}$ is the same as the peripheral speed given for the roller MN30. For the roller MPA the peripheral speed $S_{MPA} = V_s(1 + 0.02 + 0.04) = V(1 + 0.06)$. The roller MPC has the same peripheral speed as that given for the roller MPA. For the roller MPB the peripheral speed $S_{MPB} = V_s(1 + 0.02 - 0.04) = V_s(1 - 0.02)$. The peripheral speed of the roller MPD is the same as that given for the roller MPB. As stated hereinbefore, the average peripheral speed of each pair of rollers driven by the motor 40 is 1% faster (+1%) than $V_s$ while the average peripheral speed of each pair of rollers driven by the drive motor 41 is 2% faster (+2%) than $V_s$.

If, for example, a drive motor driving some group of rollers preceding the roller groups driven by the motors 40 or 41 should accidentially stop and, if as a result, the strand velocity slows down from $V_s$ to $V_s'$, the rollers in the groups controlled by the motors 40 and 41, which have the relative speeds indicated in FIGS. 31 and 32, will continue to maintain their peripheral speeds. As the strand velocity $V_S'$ continues to diminish, the slower rollers of the group controlled by the motor 41 will be the first to become synchronous with respect to the speed of the strand. at this point, and for smaller values of $V_S'$, the rollers controlled by motor 41 will pull the strand along. As $V_s'$ continues to diminish, the slower rollers of the group controlled by the motor 40 will become synchronous with respect to the diminishing strand velocity $V_s'$. At this point, and for smaller values of $V_s'$, the rollers controlled by motor 40 will pull the strand along. In both cases, the rollers of the group controlled by the motor 41 will initially exert a pull on the strand and subsequently the rollers of the group 40 will exert pull on the strand in order to effectively pull, or drag, the entire strand 24 over any stalled group of rollers preceding the group of rollers controlled by the motor 40. Thus the speed $V_s'$ is less likely to drop as much as 4% and the remaining middle rollers will not cause tension changes.

The illustration at FIG. 5 is included for the purpose of emphasizing that different diameter cylindrical rollers may be employed, provided the peripheral speed relationships hereinbefore disclosed are observed.

Although the invention has been described, and illustrated, by way of specific embodiments and practices thereof, it is to be understood that many changes in details of construction, combination and arrangement of parts, and steps, may be made without departing from the spirit and scope of the invention which is claimed hereinafter.

What is claimed is:

1. A method of conveying a strip contacting a series of rollers comprising: rotating in the same direction at least one roller at each end of the series at faster and slower speeds, respectively, whereby the strip moves with tension at a velocity corresponding to the peripheral speed of the faster rotating roller plus any additional amounts resulting from expansion and stretching, and rotating in said same direction some of the remaining rollers with peripheral speeds faster than the strip and the rest of the remaining rollers slower than the strip whereby the average peripheral speed of all remaining rollers is the same as the strip velocity and whereby the forces applied to the strip by all the remaining rollers cancel each other so that said tension is unchanged.

2. A method of conveying a strip contacting a series of rollers comprising: rotating in the same direction at least one roller at each end of the series at faster and slower peripheral speeds, respectively, whereby the strip moves in the lengthwise direction with tension at a velocity substantially the same as said faster peripheral speed, and rotating in said same direction one half of the remaining rollers in the series at peripheral speeds faster than the strip velocity and the other half of the remaining rollers in the series at peripheral speeds slower than the strip velocity whereby the average peripheral speed of both halves is substantially the same as the strip velocity whereby the strip velocity is substantially unchanged and whereby the forces applied to the strip by the rotation of said one half are substantially canceled by the forces applied to the strip by the roation of said other half so that said tension is substantially unchanged.

3. A method of conveying a strip contacting a series of rollers comprising: rotating in the same direction at least one roller at each end of the series, contacting opposing ends of the strip, at faster and slower peripheral speeds, respectively, whereby the strip moves toward one end of the series under tension established by rotative contact with the rollers of different speeds and at a velocity substantially the same as the faster peripheral speed, and rotating in said same direction all remaining pairs of adjacently located rollers in the series so that in each pair one roller has a peripheral speed faster than the strip velocity and the other roller in the same pair has a peripheral speed slower than the strip velocity with the average peripheral speed of the rollers in each pair being substantially the same as the strip velocity and whereby the forces applied to the strip by each rotating pair substantially cancel each other so that the established strip tension is substantially unchanged.

4. In the conveying of a strip having an established longitudinal tension over a series of unidirectionally rotated support rollers contacting the strip along its length and moving it at an established velocity in the direction of its length from one end of the series to another end thereof, the method of maintaining the strip tension and strip velocity substantially at their established values in order to prevent tearing or cobbling of the strip comprising: rotating a first plurality of rollers contacting the strip along its length at peripheral speeds faster than the established strip velocity so that all rollers of the first plurality exert forces in the same longitudinal direction on the moving strip, and rotating a second plurality of rollers contacting the strip along its length at peripheral speeds slower than the established strip velocity so that all rollers of the second plurality exert forces in the same longitudinal direction on the moving strip but opposing those forces exerted thereon by the first plurality, the average peripheral speed of the first and second pluralities being substantially the same as the established strip velocity and the forces exerted on the strip by the first and second pluralities substantially cancelling each other.

5. In the conveying of a strip having an established longitudinal tension over a series of unidirectionally rotated support rollers contacting the strip along its length and moving it at an established velocity in the direction of its length from one end of the series to another end thereof, the method of maintaining the strip tension and the strip velocity substantially at their established values so as to prevent tearing or cobbling of the strip comprising: rotating one half of the rollers in the series contacting the strip along its length at peripheral speeds faster than the established strip velocity so that all rollers in said one half exert forces in the same longitudinal direction on the moving strip, and rotating the other half of the rollers in the series contacting the strip along its length at peripheral speeds slower than the established strip velocity so that all rollers in said other half exert forces in the same longitudinal direction on the moving strip but opposing the forces exerted thereon by the rollers of said one half, the average peripheral speed of the rollers of both halves being substantially the same as the established strip velocity, the forces exerted on the strip by said one half opposing and substantially cancelling the forces exerted on the strip by said other half.

6. The method according to claim 5 wherein each faster rotating roller of said one half is located adjacent a slower rotating roller of said other half, said adjacently located faster and slower rollers contacting the strip at adjacently located parts thereof whereby the force exerted on the strip at one part thereof by said faster roller is opposed and cancelled by the force exerted on the strip at an adjacent part thereof by said slower roller, the average peripheral speed of the adjacently located faster and slower rollers being the same as the established strip velocity.

7. In the conveying of a strip having an established longitudinal tension over a series of unidirectionally rotating support rollers contacting the strip along its length and moving it at an established velocity in the direction of its length from one end of the series to the opposite end thereof, the method of maintaining the established strip tension substantially unchanged comprising: rotating pairs of adjacent rollers so that in each pair one roller has a peripheral speed faster than the established strip velocity and the other roller has a peripheral speed slower than the established strip velocity and the average peripheral speed of each pair is substantially the same as the strip velocity whereby said one and other roller exert substantially equal and opposite longitudinal forces on adjacent parts of the moving strip leaving the established tension therein substantially unchanged.

8. The method according to claim 7 wherein said one and other roller of each pair have peripheral speeds according to the following relationships:

$$V_1 = V_s (1 + n)$$
$$V_2 = V_s (1 - n)$$

wherein $V_1$ represents the peripheral speed of said one roller, $V_2$ represents the peripheral speed of said other roller, $V_s$ represents the strip velocity, and n represents a positive number.

9. A method of conveying strip comprising: supporting a length of strip on a series of rollers with each roller contacting a different part of the strip along the supported length thereof and supporting a portion of the strip's weight; longitudinally stressing at least the supported length of the strip to establish tension therein; moving the tensioned strip in the direction of its length at an established velocity in tangential contact with the rollers toward an end of the series; and unidirectionally rotating pairs of adjacently located rollers so that in each pair one roller tangentially contacts the strip moving in the same direction at a speed faster than the strip velocity and the other roller tangentially contacts the strip moving in said same direction at a speed slower than the strip velocity whereby the tangential contact between said one faster rotating roller and the moving strip introduces a first longitudinally directed frictional force in the moving strip and the tangential contact between said other slower rotating roller and the moving strip introduces a second longitudinally directed frictional force in the moving strip, said first and second frictional forces being of substantially equal magnitude and oppositely directed so that the established strip tension is substantially unchanged.

10. The method according to claim 9 wherein the average tangential speed of each pair of rollers is substantially the same as the strip velocity.

11. The method according to claim 9 wherein said one and other roller of each pair have tangential speeds related to the strip velocity in accordance with the following:

$$V_1 = V_s (1 + n)$$
$$V_2 = V_s (1 - n)$$

wherein $V_1$ represents the peripheral speed of said one roller, $V_2$ represents the peripheral speed of said other roller, $V_s$ represents the strip velocity, and $n$ represents a positive number.

12. The method according to claim 9 wherein said first and second frictional forces each have magnitudes approximately equal to that portion of the weight of the strip which is supported between said one and other roller.

13. A method of conveying strip comprising: supporting a length of strip on a series of rollers with each roller contacting a different part of the strip along the supported length thereof and supporting a portion of the strip's weight; moving the strip in the direction of its length in tangential contact with the rollers towards one end of the series; and, rotating pairs of rollers so that in each pair one rotating roller's tangential motion frictionally contacting one part of the strip is faster than the strip's movement in the same direction and the other rotating roller's tangential motion frictionally contacting another part of the strip is slower than the strip's movement in the same direction, said one and other rollers' frictional contact with said one and other parts, respectively, of the moving strip introducing first and second frictional forces, respectively, of substantially the same magnitude at said one and other parts, respectively, of the moving strip, said frictional forces being oppositely directed in substantially the direction of the strips' movement.

14. The method according to claim 13 wherein the average of the rates of tangential movement of said one and other roller in each pair is substantially the same as the rate of movement of the strip.

15. The method according to claim 14 wherein the rate of movement of the strip is at an established velocity and the rates of tangential movement of said one and other rotating rollers are at established tangential speeds and are related to the strip velocity as follows:

$$V_1 = V_s (1 + n)$$
$$V_2 = V_s (1 - n)$$

wherein $V_1$ represents the peripheral speed of said one roller, $V_2$ represents the peripheral speed of said other roller, $V_s$ represents the strip velocity, and n represents a positive number.

16. A method of conveying strip comprising: moving a strip in the direction of its length at an established velocity over a series of rollers supporting the strip and tangentially contacting it at different parts along its length; and, independently rotating pairs of the rollers so that in each pair one rotating roller's tangential frictional contact with one part of the moving strip is directed in the same direction as the direction of the strip's velocity and the other rotating roller's tangential frictional contact with another part of the moving strip is directed in said same direction as the direction of the strip's velocity and at a slower tangential speed than the strip's velocity, the tangential frictional contacts with the different parts of the moving strip by said one and other rollers introducing substantially equal frictional forces in said different parts, said equal frictional forces in said different parts of the strip being in opposite directions.

17. The method according to claim 16 wherein said one and other rollers of each pair have tangential speeds related to the strip velocity according to the following:

$V_1 = V_s (1 + n)$
$V_1 = V_s (1 - n)$ wherein $V_1$ represents the peripheral speed of said one roller, $V_2$ represents the peripheral speed of said other roller, $V_s$ represents the strip velocity, and n represents a positive number.

18. In the method of conveying strip by rotational friction contact between the strip and the periphery of each roller in a series of unidirectionally rotating rollers supporting a length of the strip and moving it in the direction of its length toward one end of the series, the improvement comprising: rotating some of the rollers in the series so that their strip contacting peripheries move faster than the strip; and, rotating the rest of the rollers in the series so that their strip contacting peripheries move slower than the strip.

19. In the method of conveying strip by rotational friction contact between the strip and the periphery of each roller in a series of rotatable rollers supporting the strip and moving it in the direction of its length toward one end of the series, the improvement comprising rotating at least one roller at said one end of the series so that the rotational frictional contact between the periphery of said one roller and the strip causes the strip to move at an established velocity; rotating all the remaining rollers in the series in the same direction as said one roller such that the strip contacting peripheries of some of the remaining rollers move at faster speeds than the established strip velocity and exert frictional forces on the strip at different parts thereof along its length and the strip contacting peripheries of the rest of the remaining rollers move at slower speeds and the established strip velocity and exert frictional forces on the strip at different parts thereof along its length, the frictional forces exerted by the faster rollers cancelling those exerted by the slower rollers.

20. The method according to claim 18 wherein the strip moves at an established velocity and the average speed of the faster and slower moving peripheries equals the strip velocity.

21. The method according to claim 19 wherein all of the faster moving peripheries and all of the slower moving peripheries have peripheral speeds related to the strip velocity according to the following:

$V_1 = V_s (1 + n)$
$V_2 = V_s (1 - n)$ wherein $V_1$ represents the peripheral speed of said one roller, $V_2$ represents the peripheral speed of said other roller, $V_s$ represents the strip velocity, and n represents a positive number.

22. In the method of conveying strip by rotational friction contact between the strip and the periphery of each roller in a series of unidirectionally rotating rollers supporting a length of the strip and moving it in the direction of its length toward one end of the series, the improvement comprising: rotating pairs of the rollers so that in each pair of one roller's strip contacting periphery moves faster than the strip and the other roller's strip contacting periphery moves slower than the strip.

23. The method according to claim 22 wherein the strip moves at an established velocity and the strip contacting peripheries of said one and other rollers move at an average peripheral speed the same as the strip velocity.

24. The method according to claim 22 wherein the peripheral speeds of said one and other rollers are related to the strip velocity according to the following:

$V_1 = V_s (1 + n)$
$V_2 = V_s (1 - n)$ wherein $V_1$ represents the peripheral speed of said one roller, $V_2$ represents the peripheral speed of said other roller, $V_s$ represents the strip velocity, and n represents a positive number.

25. The method according to claim 24 wherein said one and other roller of each pair are located adjacent each other.

26. The method according to claim 25 wherein rotational friction contact on the strip by said one roller is equalled and opposed by the rotational friction contact on the strip by said other adjacently located roller.

27. Apparatus for conveying strip comprising: first, second, and third pluralities of serially arranged rollers, said pluralities being serially arranged with said second plurality being located between said first and third pluralities to form a unitary series of rollers on which a length of the strip is supportable with each roller in said unitary series contacting the strip at a different part thereof along its supported length, means for rotating the rollers in said first and third pluralities in the same direction at slower and faster speeds, respectively, whereby rotating frictional contact between the strip and said rollers of said first and third pluralities establishes tension in the strip as well as the velocity thereof in a direction toward said third plurality, and means for rotating pairs of rollers in the second plurality in said same direction as the rollers of said first and third pluralities so that in each pair one roller has a peripheral speed faster than the strip velocity and the other roller has a peripheral speed slower than the strip velocity.

28. The apparatus according to claim 27 wherein the average peripheral speed of each said pair of rollers is substantially the same as the strip velocity.

29. The apparatus according to claim 27 wherein the peripheral speeds of said one and other rollers are related to the strip velocity according to the following:

$V_1 = V_s (1 + n)$
$V_2 = V_s (1 - n)$ wherein $V_1$ represents the peripheral speed of saidone roller, $V_2$ represents the peripheral speed of said other roller, $V_s$ represents the strip velocity, and n represents a positive number.

30. The apparatus according to claim 27 wherein said one and other rollers of each pair are located adjacent each other.

31. The apparatus according to claim 27 wherein the frictional force developed by the rotational frictional contact on the strip by said one roller of each said pair is substantially equalled and opposed by the frictional force developed by the rotational frictional contact on the strip by said other roller of each said pair thereby leaving the established tension in said strip substantially unchanged.

32. The apparatus according to claim 27 wherein said second plurality has a greater number of rollers than either the first or third pluralities.

33. Apparatus for conveying strip comprising: a series of rollers for supporting a length of strip wherein each roller contacts a different part of the strip along its length; means for unidirectionally rotating at least one roller at each end of the series at slower and faster speeds, respectively, whereby rotational friction contact between the strip and said rollers at each said end establishes tension in the strip as well as the velocity thereof in the direction of its length moving toward the faster rotating roller; and, means for rotating, in the same direction as the aforesaid end rollers, some of the remaining rollers in the series at peripheral speeds faster than the strip velocity and the rest of the remaining rollers at peripheral speeds slower than the strip velocity.

34. The apparatus according to claim 33 wherein the average peripheral speed of all said remaining rollers is substantially the same as the strip velocity.

35. The apparatus according to claim 33 wherein the peripheral speeds of said some and rest of the remaining rollers are related to the strip velocity according to the following:
$$V_1 = V_s (1 + n)$$
$$V_2 = V_s (1 - n)$$
wherein $V_1$ represents the peripheral speed of said one roller, $V_2$ represents the peripheral speed of said other roller, $V_s$ represents the strip velocity, and n represents a positive number.

36. The apparatus according to claim 33 wherein the frictional forces developed by frictional contact between the strip and some of the remaining rollers are substantially equalled and opposed by the frictional forces developed by frictional contact between the strip and said rest of the remaining rollers thereby leaving the established tension in the strip substantially unchanged.

37. In a conveyor comprising a series of rollers, the improvement comprising: means for unidirectionally rotating at least one roller at each end of the series at slower and faster speeds, respectively; and, means for rotating in the same direction as the aforesaid end roller pairs of the remaining rollers so that in each pair one roller rotates faster than said faster rotating end roller and the other roller in said pair rotates slower than said faster rotating end roller.

38. The conveyor according to claim 37 wherein said one and other roller of each pair have speeds related to said faster rotating end roller according to the following:
$$R_1 = R_s (1 + n)$$
$$R_2 = R_s (1 - n)$$
wherein $R_1$ represents the rotational speed of said one roller of said pair, $R_2$ represents the rotational speed of said other roller of said pair, $R_s$ represents the rotational speed of said faster rotating end roller and n is a positive number.

39. Apparatus for conveying strip comprising: a series of independently rotatable elements for supporting a length of strip wherein each element contacts a different part of the strip along its length, means for tensioning the strip lengthwise and moving it at an established velocity lengthwise toward one end of the series, and means for rotating some of said elements at peripheral speeds faster than the strip velocity and the remaining elements in said series at peripheral speeds slower than the strip velocity, the average peripheral speed of all said elements being substantially the same as the strip velocity.

40. The apparatus according to claim 29 wherein said faster rotating elements frictionally contact the strip and create frictional forces which are substantially cancelled by the frictional forces created by frictional contact exerted on the strip by said slower rotating elements.

41. The conveyor according to claim 37 wherein said rollers are frustro-conical rollers and each said frustro-conical roller has a larger diameter at one end thereof and a smaller diameter at the other end thereof, said series of frustro-conical rollers being arranged such that adjacently located rollers have larger and smaller diameter ends next to each other.

42. A conveyor comprising: a plurality of groups of serially arranged rollers; a plurality of drive means, each drive means being coupled with the serially arranged rollers of a particular group and operable for unidirectionally rotating the rollers in each group in pairs such that, in each pair, one roller is rotatable at a peripheral speed faster than the peripheral speed of the other roller in said pair; and, a plurality of motor means, each motor means being coupled to a particular drive means for operating said drive means to rotate said rollers in a particular group.

43. The conveyor according to claim 42 wherein:
$$V_1 = V_s (1 + m + n)$$
$$V_2 = V_s (1 + m - n)$$
where $V_1$ and $V_2$ represent the peripheral speeds of said one and other roller, $V_s$ represents the velocity of a strip being conveyed on the rollers of said conveyor, n represnts a positive number, and m represents a number which may be either positive or negative.

44. The conveyor according to claim 42 wherein at least one group of rollers at one end of said series have an average peripheral speed which is faster than the average peripheral speed of the rollers in the other groups.

45. The conveyor according to claim 42 wherein said rollers are tapered, adjacent rollers having aligned larger and smaller diameter peripheries.

46. A conveyor comprising: a plurality of groups of serially arranged rollers, a plurality of drive means, each drive means being coupled with the rollers of a particular group and operable for unidirectionally rotating the rollers in each group in sets of rollers such that, in each set, some rollers are rotatable at peripheral speeds faster than the other rollers in the same set; and, a plurality of motor means, each motor means being coupled to a drive means for operating said drive means to rotate the rollers in the group.

47. In the method of conveying strip by rotational friction contact between the strip and the periphery of each roller in a series of unidirectionally rotating rollers supporting a length of the strip and moving it toward one end of the series, the improvement comprising: rotating some of the rollers in said series so that their strip-contacting peripheries move faster than the moving strip; and, rotating the remaining rollers in said series so that their strip-contacting peripheries move slower than the moving strip.

48. The method according to claim 47 wherein the faster-moving strip-contacting peripheries exert forces on the strip in the direction of strip movement and the slower-moving strip-contacting peripheries exert forces on the strip in a direction opposite the direction of strip movement, the forces exerted by the faster-moving peripheries being substantially cancelled by the forces exerted by the slower-moving peripheries.

49. The method according to claim 48 wherein the average of the speeds of all the faster-moving peripheries and all the slower moving peripheries is substantially equal to the speed of the moving strip.

50. A conveyor comprising: a first plurality of groups of serially arranged rollers; a second plurality of drive means, each drive means being coupled with an individual group of serially arranged rollers of said first plurality, each drive means being operable for unidirectionally rotating all the rollers in said individual group in sets such that, in each set, some of the rollers therein are rotated at peripheral speeds which are faster than the peripheral speeds of the rest of the rollers in the same set; and, a third plurality of drive motors, each motor being coupled with an individual drive means for operating said drive means.

51. The conveyor according to claim 50 wherein each said set is comprised of at least two rollers wherein one roller is rotated at a peripheral speed faster than the other roller in the set and wherein $$V_1 = V_S (1 + m + n)$$
$$V_2 = V_S (1 + m - n)$$

and $V_1$ represents the peripheral speed of said one roller, $V_2$ represents the peripheral speed of said other roller, $V_S = V_1 + V_2/2$, $m$ is a positive or negative number representing percent change from $V_S$ of the speed of the motor which ultimately rotates said one and other roller, and $n$ is positive number representing the percent change from $V_S$ of the peripheral speeds of said one and other rollers.

52. The combination according to claim 50 wherein each said set consists of like numbers of rollers rotated at faster and slower peripheral speeds, respectively, and wherein all of the faster rollers have the same peripheral speed $V_1$ and all the slower rollers have the same peripheral speed $V_2$.

53. The combination according to claim 52 wherein $$V_1 = V_S (1 + m + n)$$
$$V_2 = V_S (1 + m + n)$$
$$V_S = V_1 + V_2/2$$

and, $V_1$ and $V_2$ are defined in claim 52, $m$ is a positive or negative number representing percent change relative to $V_S$ of the speed of the motor driving said faster and slower rollers in the set, and n is a positive number representing percent change relative to $V_S$ of the peripheral speeds of said faster and slower rollers.

* * * * *